(12) United States Patent
Hashimoto et al.

(10) Patent No.: US 10,193,478 B2
(45) Date of Patent: Jan. 29, 2019

(54) MOTOR DRIVING DEVICE AND DRIVING METHOD OF THE SAME

(71) Applicant: Rohm Co., Ltd., Kyoto (JP)

(72) Inventors: Hiroki Hashimoto, Kyoto (JP);
Ryoichi Inoue, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 150 days.

(21) Appl. No.: 15/133,584

(22) Filed: Apr. 20, 2016

(65) Prior Publication Data

US 2016/0315571 A1 Oct. 27, 2016

(30) Foreign Application Priority Data

Apr. 24, 2015 (JP) .................................. 2015-089358

(51) Int. Cl.
*H02P 8/00* (2006.01)
*H02P 8/18* (2006.01)

(52) U.S. Cl.
CPC ...................................... *H02P 8/18* (2013.01)

(58) Field of Classification Search
USPC ................. 318/685, 696, 599, 120
See application file for complete search history.

(56) References Cited

U.S. PATENT DOCUMENTS

| 8,129,934 | B2 | 3/2012 | Ando | |
|---|---|---|---|---|
| 8,659,259 | B2 | 2/2014 | Suda | |
| 2006/0255760 | A1* | 11/2006 | Yoshihisa | H02P 8/36 318/685 |
| 2011/0057600 | A1* | 3/2011 | Suda | H02P 8/12 318/696 |

FOREIGN PATENT DOCUMENTS

| JP | 2005-184897 | 7/2005 |
|---|---|---|
| JP | 2007-104839 | 4/2007 |
| JP | 2009-213344 | 9/2009 |
| JP | 2011-078301 | 4/2011 |

* cited by examiner

*Primary Examiner* — Eduardo Colon Santana
*Assistant Examiner* — Iftekhar Mustafa
(74) *Attorney, Agent, or Firm* — Fish & Richardson P.C.

(57) ABSTRACT

A motor driving device and driving method of the same used to surely suppress the influence of counter electromotive force is provided. The motor driving device 100 includes an auto-decay portion 141. The auto-decay portion 141 controls a path of a electric current flow in a motor coil when supplying the electric current and when decaying the electric current. The influence of counter electromotive force generated in a stepping motor 200 can be suppressed by the auto-decay portion 141 configured to control so that a ratio or an decay time of a slow decay mode and a fast decay mode of previous cycle is different from a ratio or an decay time of the slow decay mode and the fast decay mode of current cycle.

16 Claims, 14 Drawing Sheets

(a) power supply mode → slow decay (b) power supply mode → fast decay

MOTOR DRIVING DEVICE AND DRIVING METHOD OF THE SAME

BACKGROUND

The present invention is related to a motor driving device and a driving method of the same.

There are various motors such as a stepping motor, a direct current motor or the like existing in motors. For example, a stepping motor is used for, for example, operating a paper feeding portion of a copy machine or a printer or a reading portion of a scanner.

FIG. 12 shows an H-bridge circuit used in the conventional stepping motor driving device. The H-bridge is, for example, arranged at a front section of a stepping motor and configured as a circuit portion for directly driving the stepping motor. The H-bridge includes P-channel Metal Oxide Semiconductor (PMOS) transistors Q11, Q12, and N-channel Metal Oxide Semiconductor (NMOS) transistors Q13, Q14. Diodes D11, D12, D13 and D14 are configured to form a body diode of each transistor. If the node for connecting the transistor Q11 and the transistor Q13 is set as X, and the node for connecting the transistor Q12 and the transistor Q14 is set as Y, a motor coil L1 is connected between the node X and the node Y. In addition, the motor coil L1 indicates one phase. In the situation of two or three phases, two or three motor coils L1 are prepared, respectively. In this specification, one phase is shown for convenience of illustration. In this specification, only one phase is illustrated, and the driving actions for other phases can also be illustrated in the similar manner so as to be omitted.

The electric current path entering the H-bridge circuit is switched for performing the control of activation, rotation direction switch and stop of the stepping motor. In other words, a power supply mode and a electric current decaying mode are distinguished according to the electric current path entering the motor coil L1, wherein it has been known that the electric current decaying mode includes a slow decay mode, a fast decay mode and a mix decay mode consisting of the slow decay mode and the fast decay mode.

FIG. 12(a) shows the on-state and the off-state of each transistor and the electric current path of the H-bridge circuit while switching from the power supply mode to the slow decay mode. By using the arrow symbol (→), it is indicated as the power supply mode before the arrow symbol, and it is indicated as the on-state or the off-state of each transistor in the slow decay mode after the arrow symbol. The electric current entering the motor coil L1 in the slow decay mode is indicated by the symbol i10a. The electric current i10a flows when the transistors Q11, Q12 are turned off and the transistors Q13, Q14 are turned on. At this time, the electric current i10a circularly flows in the path (transistor Q13→motor coil L1→transistor Q14→transistor Q13). In addition, the power supply mode is performed for rotating the stepping motor at a specified rating; meanwhile, the electric current i10 is supplied from a power source Vpp to the path (transistor Q11→transistor Q14). At this time, the transistors Q11, Q14 are turned on, and the transistors Q12, Q13 are turned off.

FIG. 12(b) shows the on-state and the off-state of each transistor and the electric current path of the H-bridge circuit while switching from the power supply mode to the fast decay mode. By using the arrow symbol (→), it is indicated as the power supply mode before the arrow symbol, and it is indicated as the on-state or the off-state of each transistor in the fast decay mode after the arrow symbol. The electric current entering the motor coil L1 in the fast decay mode is indicated by the symbol i10b. The electric current i10b flows when the transistors Q11, Q12 and Q14 are turned off and the transistor Q13 is turned on. At this time, the electric current i10b flows in the path (transistor Q13→motor coil L1→transistor Q12). Meanwhile, regenerative current flows into the body diode D12 of the transistor Q12, but the transistor Q12 can be in the on-state at this time. In addition, the electric current i10b flowing into the motor coil L1 in the fast decay mode and the electric current i10 flowing in the power supply mode are in the opposite directions, i.e. the electric current i10b flowing toward the power supply Vpp.

FIG. 13 schematically shows the waveforms of the electric current flowing into the motor coil L1 when the electric current is decaying in the slow decay mode and the fast decay mode.

FIG. 13(a) schematically shows the waveform of coil current i10s flowing into the motor coil L1 in the slow decay mode. For convenience of illustration, the periods P1, P2, P3, P4 and P5 are shown along the time axis, respectively. The period P1 is the power supply mode, which controls the coil current i10s flowing into the motor coil L1 to gradually approach a reference current value IREF. When the coil current i10s reaches the reference current value IREF, the power supply mode is ended, and the period P2 enters the slow decay mode. When the specified time set for the slow decay passes, it enters the power supply mode in the period P3, again. The coil current i10s is controlled by repeatedly performing a series of actions, i.e. raising the coil current i10s to the reference current value IREF in the periods P3 and P5, and switching again to the slow decay mode in the period P4.

In the slow decay, when the coil current i10s is reduced (decaying), the voltage applied between two ends of the motor coil L1 is decreased, and the regenerative current is stably decreased. Hence, the current ripples become small, which is favorable to torque of the motor. However, in a region of small electric current, the motor coil is easily affected by the increased output electric current caused by the deterioration of electric current controllability or the counter electromotive force of the motor driven by high pulse rateat a half-step mode or a quarter-step mode. Hence, it would occur that the coil current i10s fails to follow the change of counter electromotive force and thus the electric current waveform deforms, resulting in the poor condition that the vibration of the motor is increased. In addition, if the electric current exceeds the predetermined electric current due to the influence of the counter electromotive force, deterioration may occur to the stepping motor or an integrated circuit (not shown) for driving the stepping motor in the predetermined time.

FIG. 13(b) shows the waveform of coil current i10f in the fast decay mode. Like FIG. 13(a), the periods P11, P12, P13, P14 and P15 are shown along the time axis, respectively. In the periods P11, P13 and P15, the motor coil L1 is supplied with the electric current in the power supply mode, and the coil current i10f is raised. In the periods P12 and P14, the fast decay process is performed, and thus the coil current i10s is reduced. The power supply mode and the fast decay mode are alternatively switched at the predetermined time.

In the fast decay, since the regenerative current is dramatically reduced, the deformation of the electric current waveform in the high pulse rate driving can be alleviated. In other words, in the fast decay, the advantage for improving the followability to the counter electromotive force, which cannot be expected in the slow decay, can be obtained. However, since the ripple of the coil current i10f becomes larger, the average electric current is decreased, resulting in the situation that the motor torque is reduced, the power loss of the motor is increased, and thus heat is increased.

FIG. 13(c) shows the waveform of coil current i10m in the mix decay mode. The mix decay is a electric current decay manner that eliminates the poor situations in the slow decay and the fast decay, and is a electric current decay manner for switching the slow decay and the fast decay during the electric current decay period. Generally, in the situation that the mix decay is applied, the determined ratio is generally used for switching the slow decay and the fast decay in the predetermined decay time.

In FIG. 13(c), like FIGS. 13(a) and 13(b), the periods P21, P22, P23, P24, P25 and P26 are shown along the time axis, respectively. The periods P21 and P24 are in the power supply mode, in which the motor coil L1 is supplied with electric current in the specified path. In the power supply mode, the coil current i10m is raised. The periods P22 and P25 are in the slow decay mode, in which the coil current i10m is gradually decreased. The periods P23 and P26 are in the fast decay mode, the coil current i10m is reduced faster than in the slow decay mode. In this specification, the continuous time of the periods P22 and P25 (slow decay period) is the predetermined time Tms, and the continuous time of the periods P23 and P26 (fast decay period) is the predetermined time Tmf, respectively. The length relationship between the time Tms and the time Tmf is not limited. In addition, the ratio of the time Tms to the time Tmf can be fixed according to the integrated circuit, and can be appropriately determined outside.

FIG. 14 is a diagram showing the poor situation which may occur in the slow decay and the fast decay in FIGS. 12 and 13, and showing the changes of the coil current i10n flowing into the motor coil L1 over time. FIG. 14(a) shows the overall situation of the electric current i10n flowing into the motor coil L1, and FIG. 14(b) is an enlarged diagram showing the electric current i10n1 around the time at which the coil current i10n reaches the reference current value IREF, i.e. the electric current i10n1 around time T61 in FIG. 14(a).

FIG. 14(a) shows the status that the coil current i10n is raised at time T60 and raised more during time T61~T62 (i.e. the late stage of the pulse duration Tp). Herein, the reason causing the occurrence of the counter electromotive force, i.e. the reason of the rising coil current i10n is illustrated by using FIG. 14(b).

FIG. 14(b) is a schematic view prepared for illustrating the reason of the coil current i10n exceeding the reference current value IREF. Generally, when the transistors Q11~Q14 of the H-bridge circuit shown in FIG. 12 are turned on or turned off, the spike noise occurs. Due to the influence of the spike noise, the poor situation that the coil current i10n1 cannot be precisely detected, and thus in order to prevent the erroneous detection of the coil current i10n flowing into the motor coil L1, the initial power supply is usually mandatory. In the slow decay, the coil current i10n1 should be reduced to a certain level; however, in the situation that the stepping motor has high vibration, the drop value of the coil current i10n1 becomes smaller due to the influence of the energy of the counter electromotive force. Herein, when the coil current i10n1 at time T611 reaches the reference current value IREF, it enters the slow decay mode. When the predetermined decay time reaches time T612, it is switched from the slow decay mode to the mandatory power supply mode, and the coil current i10n1 is raised.

In FIG. 14(b), time T612~T613 for the mandatory power supply mode is relatively shorter, but in the situation that the drop value of the coil current i10n1 is small, it is possible that the coil current i10n exceeds the reference current value IREF during the mandatory power supply. The status that the coil current i10n1 exceeds the reference current value IREF during the mandatory power supply at time T612~T613 is shown in FIG. 14(b). When the mandatory power supply mode is over at time T613, the detected coil current i10n1 is more than the reference current value IREF, it enters the slow decay mode again, and the coil current i10n1 begins to be declined. When the slow decay is over at time T614, it enters the mandatory power supply mode again and ends until time T615. Hence, overall, the coil current i10n is raised with time, and the original electric current decay process cannot be achieved.

The poor situations in the conventional electric current slow decay are illustrated in the above descriptions. In addition, for example, the following literatures are the background technical literatures related to the motor driving device of the present invention.

The patent literature 1 discloses a driving control device of a stepping motor for performing a first mode to increase coil current, a second mode to decay the coil current, and a third mode to decay the coil current at a higher speed than that of the second mode. Further, in the paragraph 0027~0031 of the patent literature 1, it is disclosed that mandatory charge (power supply) is performed irrespective of the level of the coil current and the level of the predetermined electric current.

The patent literature 2 provides the following motor driver circuit: in order to lower the damping vibration (decay vibration) of a stepping motor, a first decay rate and a second decay rate less than the first decay rate are mixed for setting a plurality of mixed decay rates.

The object of the patent literature 3 is to operate a stepping motor more quietly, and the patent literature 3 provides that according to whether the coil current reaches the target current value after the predetermined duration of power supply, the fast decay or the slow decay is selected for decay path in the duration of decay for performing the electric current decay.

The patent literature 4 discloses the following motor driving device: the current value detected by a detection portion is compared with a threshold value, and referenced on the comparison result a first decay mode with high-speed decay and a second decay mode with low-speed decay are selected.

BACKGROUND TECHNICAL LITERATURES

Patent Literatures

[Patent literature 1] Japanese patent laid-open publication No. 2005-184897.
[Patent literature 2] Japanese patent laid-open publication No. 2009-213344.
[Patent literature 3] Japanese patent laid-open publication No. 2007-104839.
[Patent literature 4] Japanese patent laid-open publication No. 2011-78301.

BRIEF SUMMARY OF THE INVENTION

Problems to be Solved in the Present Invention

The present invention is related to the technical field disclosed in the above patent literatures. The patent literature 1 discloses the electric current driving control device using the conventional slow decay and fast decay, but fails to suggest regulating a decay ratio of the slow decay to the fast decay. Therefore, there still exists the problem that the ripples of the coil current flowing into the motor coil become larger, and the average electric current is declined.

Although the patent literature 2 discloses regulating the decay ratio of the mix (combined) decay, but fails to suggest regulating decay time. Thus, a current control with high precision cannot be expected.

The patent literature 3 selects any one of the high-speed decay (fast decay) mode and low-speed decay (slow decay) mode, but fails to suggest mix decay of the combination of the high-speed decay and the low-speed decay. Therefore, there still exists the problem that the current ripples of the motor coil become bigger, and the average electric current is declined.

The patent literature 4 fails to disclose a method only using a low-speed decay mode to suppress the counter electromotive force. When the combination of the disclosed high-speed decay and the low-speed decay is used, the poor situation that the torque becomes lower may occur.

In view of the above problems, the object of the present invention is to provide a motor driving device for suppressing the influence of counter electromotive force, decreasing the ripples of the current value of the motor coil, and increasing the average electric current in a electric current decay mode (decay mode), and to provide a method of the same.

Technical Means for Solving Problems

In the present invention, a "decay mode" is a manner for decaying coil current flowing into a motor coil, indicating at least one mode of a slow decay mode, a fast decay mode and a mix decay mode. In addition, an "auto-decay mode" indicates a electric current decay manner that detecting the coil current flowing into the motor coil in the power supply mode, and referenced on the value of the detected electric current, automatically adjusting the performing ratio of the slow decay mode and the fast decay mode, or automatically setting the processing time for performing each decay mode. Additionally, a "first mode" is the subordinate concept of the "auto-decay mode". The "first mode" indicates the electric current decay manner that the slow decay mode and the fast decay mode are selected with the specified combined ratio, and the processing time for the slow decay mode and the fast decay mode are set as the specified value. Further, a "second mode", similar to the "first mode", is the subordinate concept of the "auto-decay mode", and the "second mode" indicates the electric current decay manner that at least one of the combined ratio and the processing time of the fast decay is larger. Moreover, "one cycle" indicates the duration of the electric current decay performing from the power supply mode to the next power supply mode. The decay mode can be a single slow decay mode, and can also be a single fast decay mode or a mix decay mode.

The motor driving device in the present invention includes: an electric current detecting portion for detecting electric current flowing into a motor coil; and an auto-decay portion for performing a power supply mode to increase the electric current flowing into the motor coil before a current value detected by the electric current detecting portion reaches a reference current value, and performing a decay control to the electric current flowing into the motor coil by using a previous cycle and a present cycle after the a current value detected by the electric current detecting portion reaches the reference current value; wherein the auto-decay portion is configured to control so that decay time of the previous cycle is different from decay time of the present cycle.

Further, according to the motor driving device of the present invention, the decay time of the present cycle is extended to be longer than the decay time of the previous cycle.

Furthermore, A driving method for a motor driving device in another embodiment of the present invention includes: a power supply step (401) of providing electric current to the motor coil; a step (402) of comparing whether coil current flowing into the motor coil reaches the reference current value by using the electric current detecting portion; a step (404) of continuously performing the power supply step in the situation that the coil current does not reach the reference current value; a step (405) of comparing whether the coil current reaches the reference current value again, and returning to the previous power supply step in the situation that the coil current does not reach the reference current value; a step (406) of performing the decay process to the coil current in the first mode in the situation that the coil current reaches the reference current value in the step (405); and a step (408) of the decay process is performed to the coil current in the second mode in the situation that it is determined in the step (402) that the coil current reaches the reference current value.

Effects of the Present Invention

According to the motor driving device and the driving method of the motor driving device of the present invention, it is capable of suppressing the influence of the counter electromotive force, decreasing the current ripples overlapping on the motor coil, and increasing the average electric current.

BRIEF DESCRIPTION OF THE DRAWINGS

FIG. 3(*a*) shows the bit constitution of the mode selection signals used for the auto-decay portion, FIG. 3(*b*) shows the combined ratio of the slow decay and the fast decay based on the slow decay, and FIG. 3(*c*) shows the processing time of the slow decay and the fast decay referenced on the unit of the number of frequency division and the reference clock signal CLK.

DETAILED DESCRIPTION

First Embodiment

Figure 1:
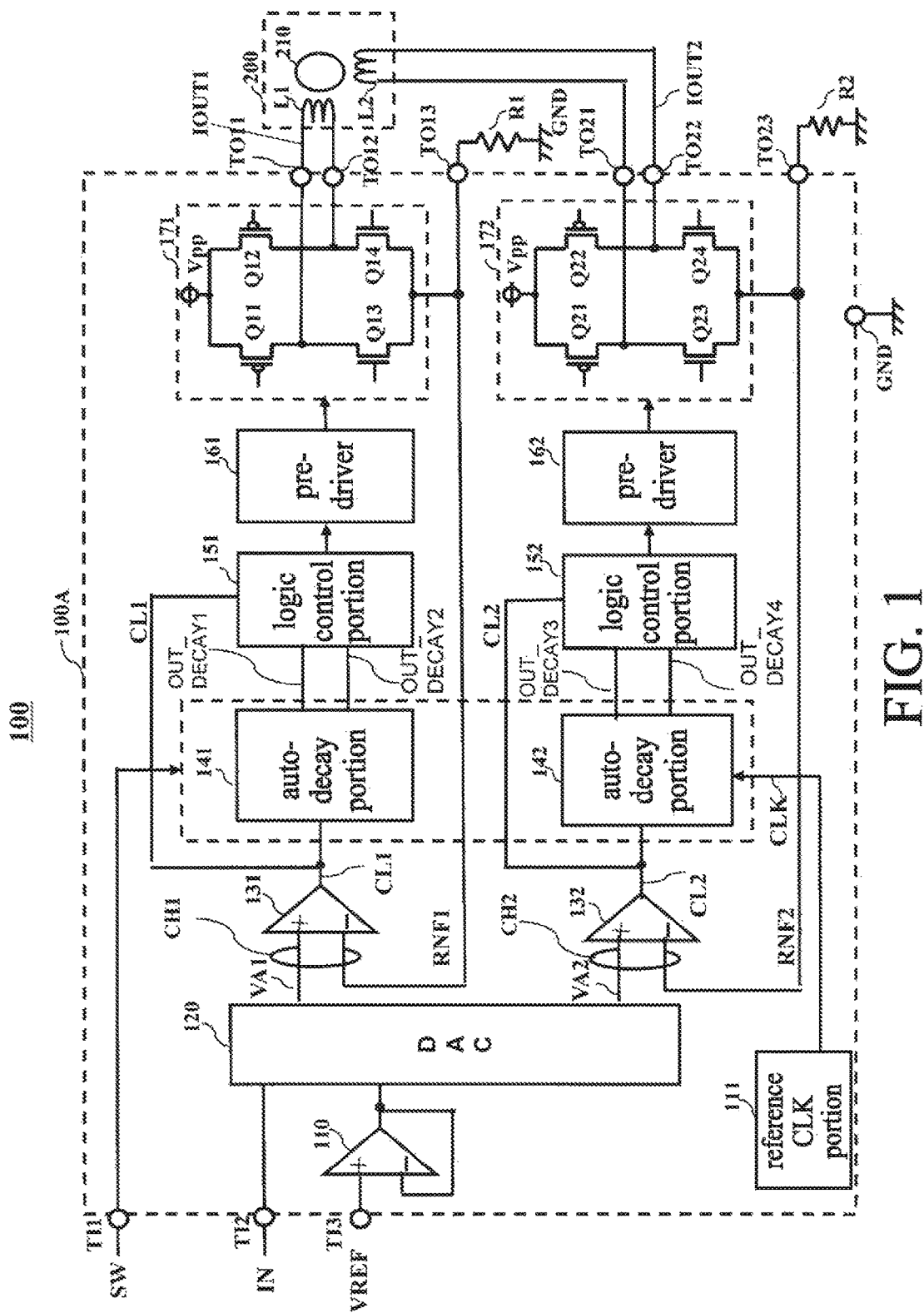
FIG. 1 is a block diagram showing a motor driving device according to the first embodiment of the present invention.

FIG. 1 shows a motor driving device 100 according to a first embodiment of the present invention. The motor driving device 100 is used for driving a stepping motor or a direct current motor, for example, and used as a driving portion for an electronic machine such as a printer, a fax machine or a camera. FIG. 1 shows a motor driving device 100 for a stepping motor. The motor driving device 100 includes an integrated circuit 100A and a stepping motor 200.

In the integrated circuit 100A, for example, input terminals TI1, TI2 and TI3, output terminals TO11, TO12, TO13, TO21, TO22 and TO23, and a ground terminal GND are prepared. A part of the output terminals are coupled to the stepping motor 200. The following mode selection signals SW for controlling auto-decay portions 141, 142 are input to the input terminal TI1. The auto-decay portions 141, 142 are described in the following descriptions. A control signal IN is input to the input terminal TI2. A reference voltage is input to the input terminal TI3. All signals input to these external terminals will be described in the following descriptions. A motor coil L1 for one phase of the stepping motor 200 is connected to the output terminals TO11 and TO12. The coil current IOUT1 flows between the output terminals TO11 and TO12. A resistor R1 is connected between the output terminal TO13 and the ground terminal GND. The electric current flowing into one phase of the stepping motor is detected by the resistor R1, and the detected electric current is converted to the voltage. A motor coil L2 for another phase of the stepping motor 200 is connected to the output terminals TO21 and TO22. The coil current IOUT2 flows between the output terminals TO21 and TO22. The resistor R2 is connected between the output terminal TO23 and the ground terminal GND. The electric current flowing into another phase of the stepping motor 200 is detected by the resistor R2, and the detected electric current is converted to the voltage. The resistors R1 and R2 are selected to have substantially the same resistance value such as 0.1Ω~0.3Ω. The resistors R1 and R2 perform the function to detect the coil current IOUT1 and IOUT2 flowing into the motor coils L1 and L2. In addition to the external terminals shown in the figure, other external terminals can also be prepared. For example, for two phases to be used as one phase, an external terminal can be prepared for stopping actions of one phase. Further, external terminals can be additionally arranged to be corresponding to three or five phases rather than two phases of the stepping motor.

In FIG. 1, for convenience of illustration, the stepping motor 200 is shown as a stepping motor with two phases.

The stepping motor 200 includes the motor coils L1 and L2 respectively corresponding to the two phases, and a rotor 210.

The coil current IOUT1 and IOUT2 flows into the motor coils L1 and L2, respectively. The rotor 210 of the stepping motor is rotated by finely changing the ratio of the current value of the coil current IOUT1 to the current value of the coil current IOUT2.

An integrated circuit 100A constituting a part of the motor driving device 100 includes an input buffer 110, a reference CLK (clock) portion 111, a D/A converter (digital to analog converter, DAC) portion 120 for converting digital signals to analog signals, comparators 131 and 132, auto-decay portions 141 and 142, logic control portions 151 and 152, pre-drivers 161 and 162, and H-bridge circuits 171 and 172. Although it is not shown, in the integrated circuit 100A, circuit functions such as an oscillating portion, a PWM (pulse width modulation) portion, an overelectric current protection, overheat shutdown and low-voltage malfunction prevention are built-in.

The input buffer 110 is a so-called voltage follower circuit for directly outputting the input reference voltage VREF, basically. The reference values of the coil current IOUT1 and IOUT2 are determined by the reference voltage VREF.

The reference clock signal CLK is output to the auto-decay portions 141 and 142 by the reference CLK portion 111, respectively. In the present invention, the frequency of the reference clock signal CLK is selected to be about 1 MHz, for example. The reference clock signal CLK is used as the reference for determining decay time of the slow decay and the fast decay in the present invention. In addition, the reference clock portion 111 for generating the reference clock signal CLK can also be configured within the auto-decay portions 141 and 142.

The DAC 120 generates the reference voltages VA1 and VA2 for the integrated circuit 100A. In other words, the reference voltage values VA1 and VA2 are determined by using the control signal IN. The control signal IN, for example, is a 4-bit signal, and is indicated as the control signals 101, 102, 103 and 104 (not shown), for example. The value of the reference voltage VA1 is determined by the control signals 101 and 102, and the value of the reference voltage VA2 is determined by the control signals 103 and 104. The combination of logic levels (1,1), (0,1), (1,0) and (0,0) of the control signals 101 and 102 are corresponding to the four values, 0%, 33%, 67% and 100%, respectively.

The motor coil L1 is supplied with the coil current IOUT1 by the circuit constituted of the comparator 131, the auto-decay portion 141, the logic control portion 151, the pre-driver 161 and the H-bridge circuit 171. Such circuit is called as a channel CH1. In addition, the motor coil L2 is supplied with the coil current IOUT2 by the circuit constituted of the comparator 132, the auto-decay portion 142, the logic control portion 152, the pre-driver 162 and the H-bridge circuit 172. Such circuit is called as a channel CH2. In addition, since the circuits corresponding to the channels CH1 and CH2 have substantially the same constitution and functions, the channels CH1 and CH2 are illustrated together.

The coil current IOUT1 (IOUT2) is converted to the output voltage RNF1 (RNF2) by using the resistor R1 (R2), the converted output voltage RNF1 (RNF2) and the reference voltage VA1 (VA2) are compared by the comparator 131 (132), and the comparison result is output from the comparator 131 (132) as an output signal CL1 (CL2). In the situation that the output voltage RNF1 (RNF2) does not reach the reference voltage VA1 (VA2), i.e. the coil current IOUT1 (IOUT2) does not reach the reference current value IREF, the output signal CL1 (CL2) is set as a high level H, for example; in the situation that the output voltage RNF1 (RNF2) reaches the reference voltage VA1 (VA2), i.e. the coil current IOUT1 (IOUT2) reaches the reference current value IREF, the output signal CL1 (CL2) is set as a low level L. The output signal CL1 (CL2) is input to the auto-decay portion 141 (142) and the logic control portion 151 (152). In addition, the resistance value of the resistor R1 (R2) is extremely small, and can be configured in the integrated circuit 100A.

The mode selection signal SW, the output signal CL1 (CL2) of the comparator 131 (132) and the clock signal CLK from the reference CLK portion 111 are respectively input to the auto-decay portion 141 (142), and the control signal OUT_DECAY1 (OUT_DECAY3) for controlling the decay mode and the control signal OUT_DECAY2 (OUT_DECAY4) for controlling the decay time are respectively output from the auto-decay portion 141 (142). The auto-decay portion 141 (142) is a circuit constitution capable of changing the decay mode of the electric current flowing into the motor coils L1 and L2 referenced on the comparison result of the coil current IOUT1 (IOUT2) and the reference current value IREF. Further, a detection start signal OUT_MINON1 and a mode change signal SELECT1 are provided inside the auto-decay portion 141 (142). The specific actions are illustrated in the following FIG. 4 to FIG. 11.

The output signal CL1 of the comparator 131 (132), the control signal OUT_DECAY1 (OUT_DECAY3) and the control signal OUT_DECAY2 (OUT_DECAY4) of the auto-decay portion 141 (142), the phase signal (not shown) indicating the polarity of the coil current IOUT1 (IOUT2) and the output signal (not shown) of the protection circuit are received by the logic control portion 151, and the motor driving signal is generated by the logic control portion 151. The phase signal is a signal for determining the rotation manner of the stepping motor 200. According to the output signal CL1 (CL2) of the comparator 131 (132), the electric current flowing into the motor coil L1 (L2) is changed from the supply mode to the decay mode. The control signal OUT_DECAY1 (OUT_DECAY3) and the control signal OUT_DECAY2 (OUT_DECAY4) of the auto-decay portion 141 (142) are signals for determining the decay mode and the processing time of the decay mode. Moreover, the logic control circuit 151 (152) further has a function for stopping actions of the stepping motor 200 when the signal indicating, for example, "abnormal" is received from the protection circuit not shown in the figure.

The driving signal transmitted from the logic control portion 151 (152) is amplified by the pre-driver 161 (162). The signal output from the pre-driver 161 (162) is provided to the H-bridge circuit 171 (172).

Figure 12:
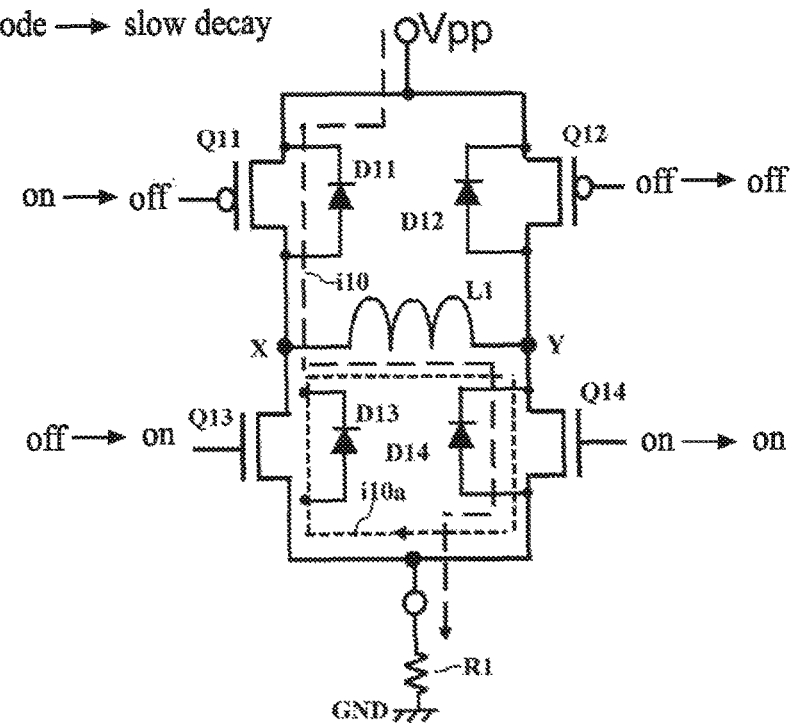
FIGS. 12(a) and 12(b) are diagrams showing the coil current flowing into the motor coil in the conventional slow decay, fast decay and mix decay, respectively.
Figure 12:
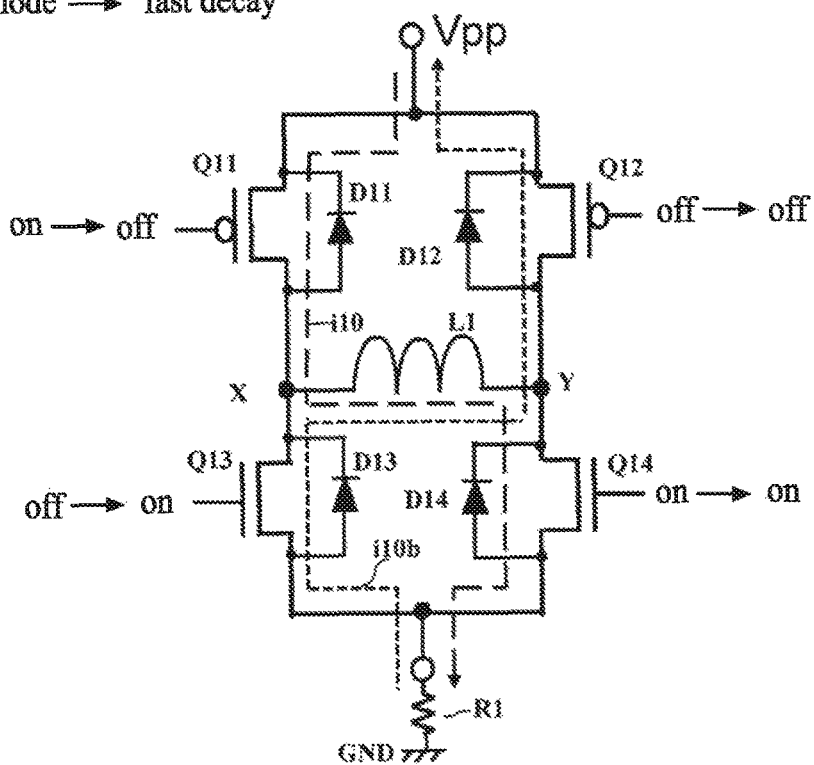
Figure 13:
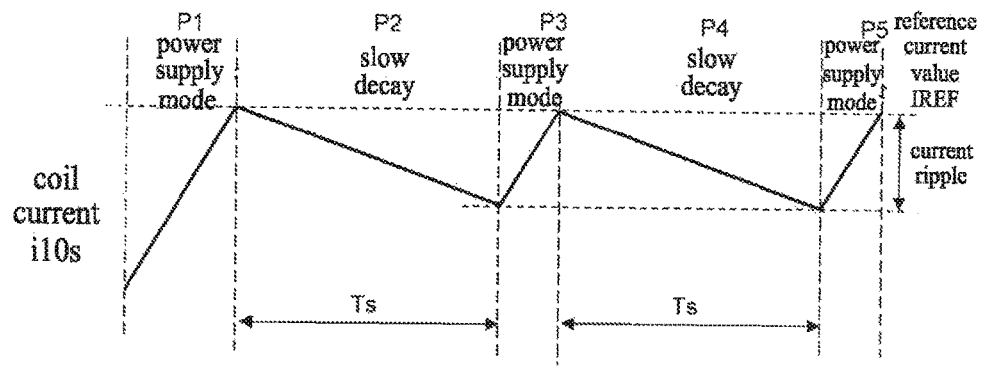
FIGS. 13(a) to (c) are diagrams showing the variation of the coil current flowing into the motor coil in the conventional slow decay, fast decay and mix decay, respectively.
Figure 13:
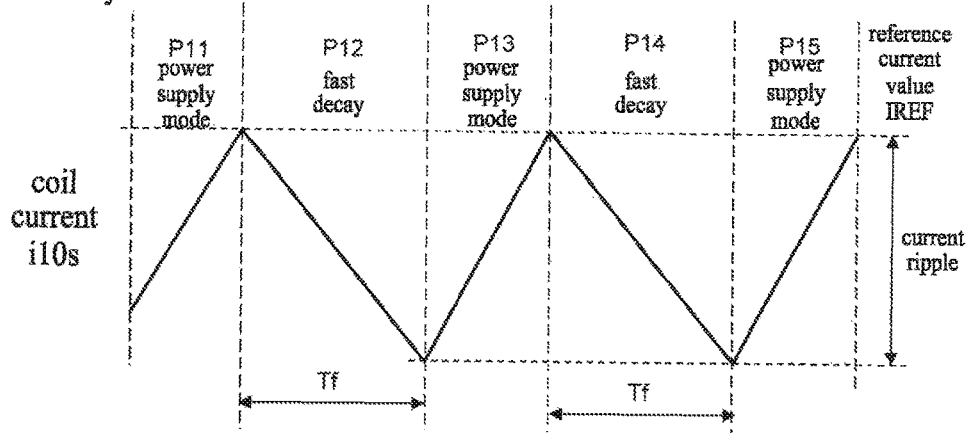
Figure 13:
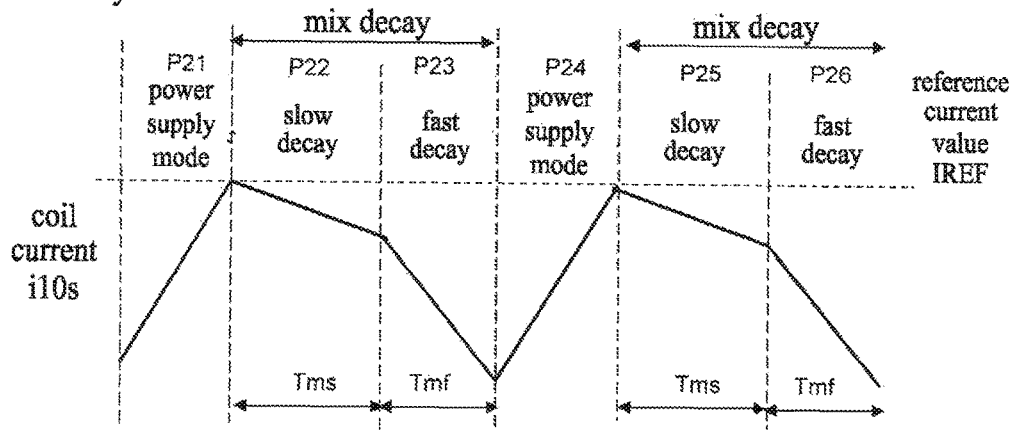
Figure 14:
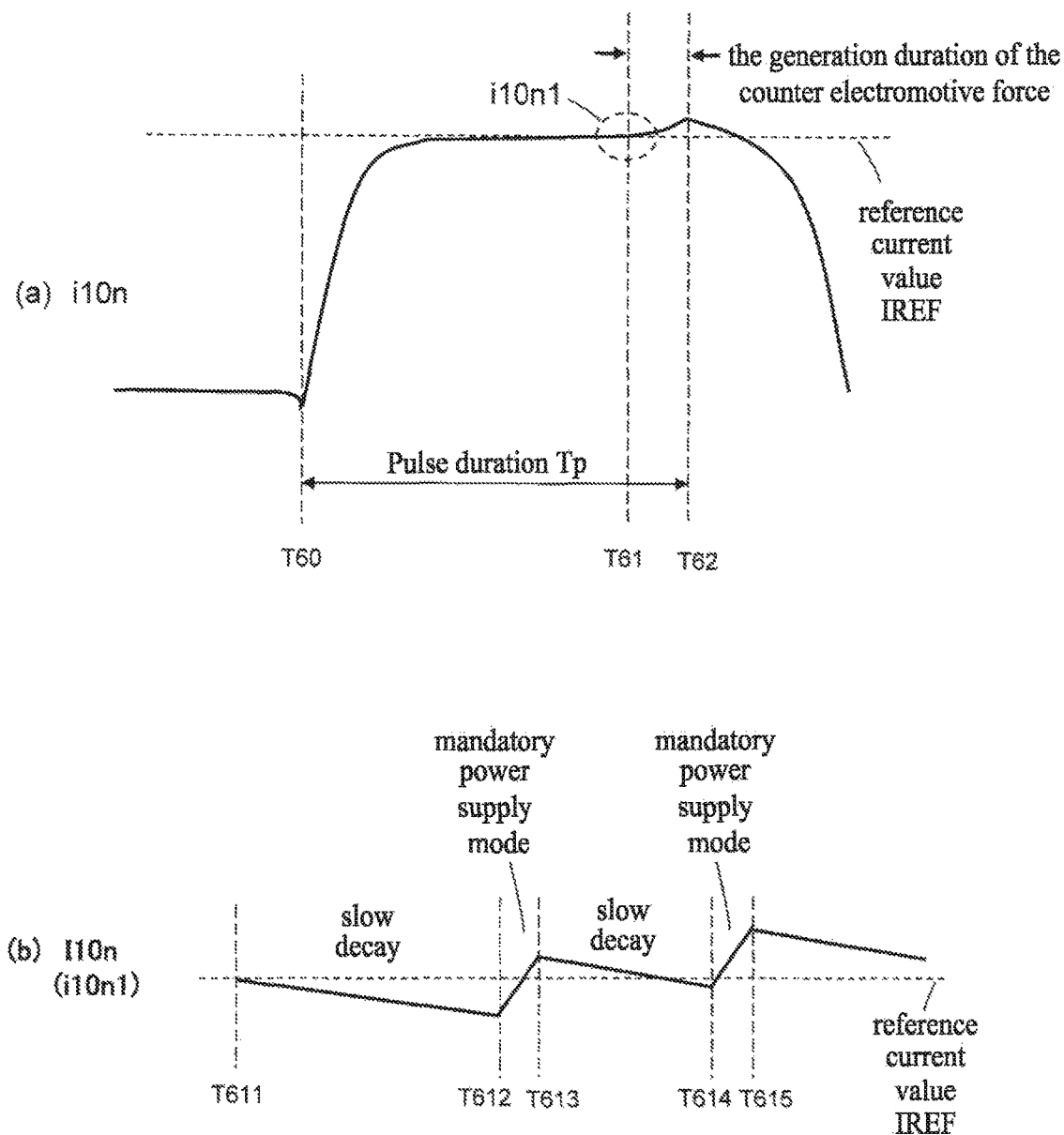
FIGS. 14(a) and 14(b) are diagrams illustrating the electric current flowing into the motor electric current when the counter electromotive force occurs in response to the conventional slow decay.

The H-bridge circuit 171 (172) is basically the same as that shown in FIG. 12. However, in order to eliminate the complicatedness of the drawings, the body diodes D11~D14 shown in FIG. 12 are not shown in the H-bridge circuit 171 (172). The H-bridge circuit 171 (172) includes transistors Q11 (Q21) and Q12 (Q22), and transistors Q13 (Q23) and Q14 (Q24). The transistor Q11 (Q21) and the transistor Q13 (Q23) are connected serially between the power source Vpp and the terminal TO13 (TO23) connected to one end of the resistor R1 (R2). Similarly, the transistor Q12 (Q22) and the transistor Q14 (Q24) are connected serially between the power source Vpp and the terminal TO13 (TO23) connected to one end of the resistor R1 (R2). The node commonly connected to the PMOS transistor Q11 (Q21) and the NMOS transistor Q13 (Q23) is connected to the output terminal TO11 (TO21). The node commonly connected to the PMOS transistor Q12 (Q22) and the NMOS transistor Q14 (Q24) is connected to the terminal TO12 (TO22). The two terminals of the motor coil L1 (L2) are respectively connected to the output terminals TO11 (TO21) and TO12 (TO22).

In addition, in the embodiment of the present invention, the H-bridge circuit 171 (172) is formed by the PMOS transistor and the NMOS transistor, but it also can be formed by only NMOS transistors. In the situation that the H-bridge circuit is constituted by NMOS transistors without PMOS transistors, a boost circuit is additionally used for driving the transistors. However, since in comparison with the PMOS transistor, the NMOS transistor can make the area of the circuit smaller, it is advantageous that using all NMOS transistors can make overall area of the circuit smaller even including the boost circuit. Therefore, the type of the transistor used for the H-bridge circuit is selected under the consideration of the factors such as the electric current flowing into the circuit or the area of the circuit. Moreover, the H-bridge circuits 171 and 172 can also be formed by bipolar transistors rather than MOS transistors.

(Auto-Decay Portion)

Figure 2:
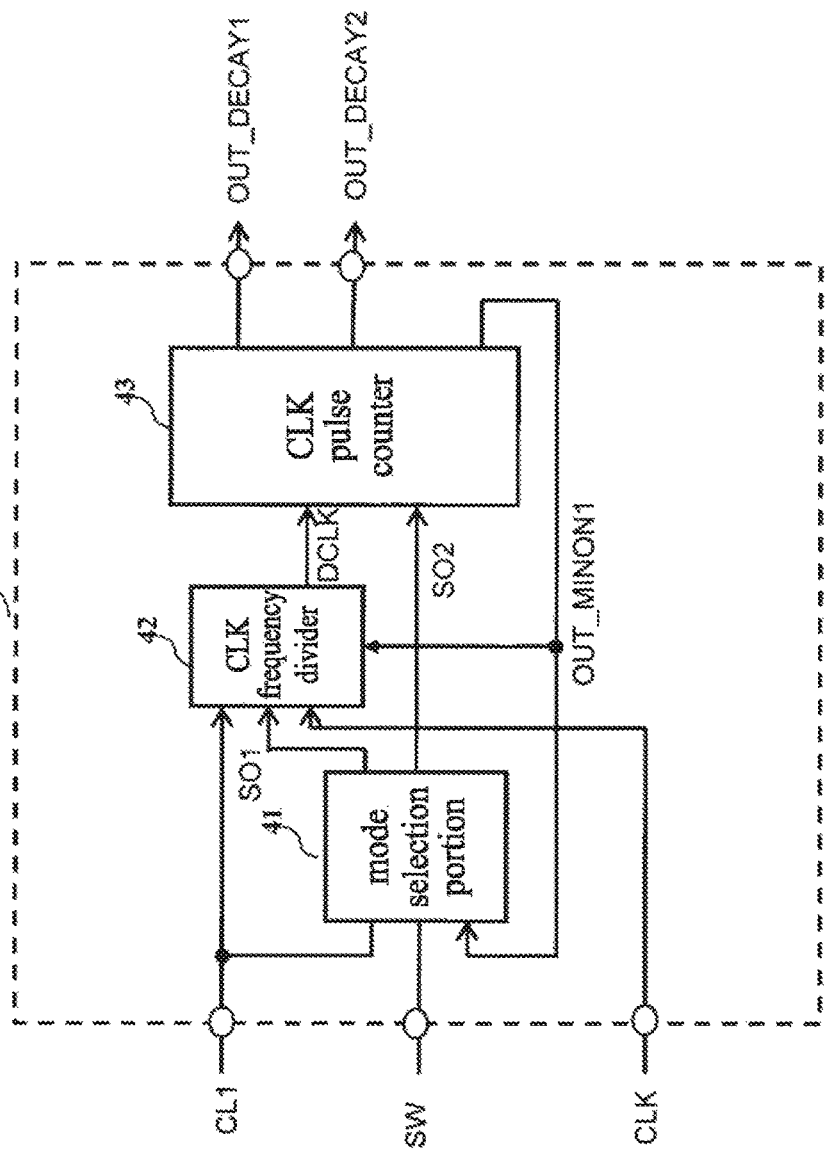
FIG. 2 is a block diagram showing the auto-decay portion shown in FIG. 1.

FIG. 2 is a block diagram showing the auto-decay portion 141 of the present invention. Since the auto-decay portions 141 and 142 have substantially the same configuration and functions, the illustration of the auto-decay portion 142 is omitted. The output signal CL1 of the comparator, the mode selection signal SW and the reference clock signal CLK are respectively input to the auto-decay portion 141, and the control signal OUT_DECAY1 for determining the decay mode and the control signal OUT_DECAY2 for determining the mandatory power supply are respectively output from the auto-decay portion 141. The decay time for one cycle and the combined ratio of the slow decay mode and the fast decay mode for one cycle are changed by using the control signal OUT_DECAY1 and the control signal OUT_DECAY2.

The auto-decay portion 141 includes a mode selection portion 41, a CLK frequency divider 42, and a CLK pulse counter 43. The circuit configuration of the auto-decay portion 141 is simply described as follows.

The output signal CL1 from the comparator 131 is input to the mode selection portion 41; the mode selection signal SW is input to the mode selection portion 41 through the input terminal TI1 configured in the integrated circuit 100A; and the detection start signal OUT_MINON1 from the CLK pulse counter 43 is input to the mode selection portion 41. In addition, the output signal CL1 is respectively applied to the mode selection portion 41 and the CLK frequency divider 42 through a latch circuit which is not shown in the figure. The output signals SO1 and SO2 are respectively output from the mode selection portion 41, and the output signals SO1 and SO2 are respectively input to the CLK frequency divider 42 and the CLK pulse counter 43.

The output signal CL1 of the comparator 131, the output signal SO1 of the mode selection portion 41 and the reference clock signal CLK are input to the CLK frequency divider 42. The frequency division output signal DCLK from the CLK frequency divider 42 is input to the CLK pulse counter 43.

The output signal CL1 of the comparator 131, the output of the CLK frequency divider 42 i.e. the frequency division output signal DCLK, the reference clock signal CLK, and the output signal of the mode selection portion 41 i.e. the output signal SO2 are respectively input to the CLK pulse counter 43. The control signal OUT_DECAY1, the control signal OUT_DECAY2 and the detection start signal OUT_MINON1 are output from the CLK pulse counter 43.

Figure 3:
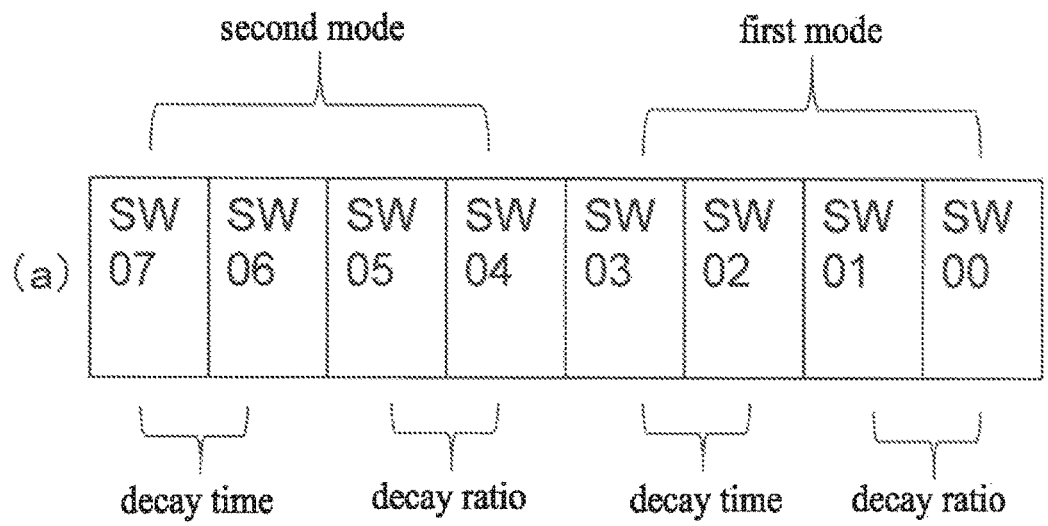
FIG. 3 shows a diagram of the mode selection signals SW for controlling the auto-decay portion 141 shown in FIG. 1 and FIG. 2.

The above descriptions are relatively simple illustration of the auto-decay portion 141, and the detailed description is as follows. FIG. 3 includes FIGS. 3(*a*), 3(*b*) and 3(*c*). FIG. 3(*a*) shows the bit configuration of the mode selection signal used in the auto-decay portion 141 shown in FIG. 1 and FIG. 2. FIG. 3(*b*) shows the combined ratio of the slow decay and the fast decay based on the slow decay. FIG. 3(*c*) shows the processing time of the slow decay and the fast decay by using the frequency division number (frequency division ratio) and the reference clock signal CLK as the unit.

FIG. 3(*a*) shows the bit configuration of the mode selection signal SW. The mode selection signal includes, for example, 8 bits, wherein the low order 4 bits are assigned to the first mode, and the high order 4 bits are assigned to the second mode, for example. 2 bits of the 4 bits assigned to the first mode set the combined ratio of the slow decay and the fast decay in one cycle of the decay mode, and the remaining 2 bits set the processing time of this mode. Herein, the one cycle indicates the all duration (time) of the slow decay and the fast decay as a whole. It is the same way to the second mode. In other words, 2 bits of the 4 bits set the combined ratio of the slow decay and the fast decay, and the remaining 2 bits set the processing time of such mode.

FIG. 3(*b*) shows an example of the combined ratio of the slow decay and the fast decay based on the slow decay. As show in FIG. 3(*a*), the combined ratios of the two decays are set by the address SW00 and SW01 in the first mode, and set by the address SW04 and SW05 in the second mode, respectively. The logic value of the address SW00 is "0", and the ratio is set as 100% when the logic value of the address SW01 is "0". In other words, the process is performed only with the slow decay. The logic value of the address SW00 is "1", and the ratio is set as 67% when the logic value of the address SW01 is "0". In other words, the slow decay is 67% of the whole of the one cycle, and the remaining 33% is fast decay. Therefore, the slow decay is set as twice decay time of the fast decay, and the slow decay is implemented as the leading decay type. When the logic value of the address SW00 is set as "0" and the logic value of the address SW01 is set as "1", the ratio of the slow decay is set as 33%, the ratio of the fast decay is 67%, the fast decay is set as twice decay time of the slow decay, and the fast decay is implemented as the leading decay process. When the logic value of the address SW00 is set as "1" and the logic value of the address SW01 is set as "1", the ratio of the slow decay is set as 0%, the ratio of the fast decay is 100%, and only the fast decay is performed as the decay process.

The first mode has been illustrated, and to similarly illustrate the second mode, the address SW00 is replaced with the address SW04, and the address is replaced with the address SW05, respectively. In addition, the ratio of decay and the number of levels are design items, and for example, the ratio can be four levels of 10%, 37%, 63% and 90%. Certainly, the number of levels can be 8, for example, rather than 4.

FIG. 3(*c*) shows the processing time of the slow decay and the fast decay by using the frequency division number (frequency division ratio) and the reference clock signal CLK as a unit.

The combined ratio of the slow decay and the fast decay in the first mode is set by the address SW00 and SW01. The electric current decay time is determined by the address SW02 and SW03. The second mode is designated by the address SW04~SW07. The combined ratio of the slow decay and the fast decay is set by the address SW04 and SW05. The electric current decay time is determined by the address SW06 and SW07.

With regard to the 2 bits signal for determining the decay mode, such as the combination of the logic value (1,1), (0,1), (1, 0) and (0,0), for example, the ratio of the slow decay or the fast decay to the whole slow decay is determined as four levels of 0%, 33%, 67% and 100%. Similarly, with regard to the 2 bits signal for determining the decay time (decay ratio), such as the combination of the logic value (1,1), (0,1), (1,0) and (0,0), for example, the frequency division of the CLK frequency divider 42 is determined as four levels of 8 frequency divisions, 4 frequency divisions, 2 frequency division and 1 frequency division. Certainly, the frequency division ratio can also be set as four levels of 32 frequency divisions, 16 frequency divisions, 8 frequency divisions and 4 frequency divisions, for example. This setting of the frequency division ratio is not fixed, but is properly determined according to the frequency of the reference clock signal CLK or the electric current decay time.

In the initial status of the auto-decay portion 141, in the situation that the mode selection signal SW is set so as to process in the first mode, the output signal SO1 of the mode selection portion 41 outputs the decay processing conditions which are set by the address SW00 and SW01, and the output signal SO2 outputs the decay processing conditions which are set by the address SW02 and SW03. However, in the initial status of the auto-decay portion 141, in the situation that the mode selection signal SW is set so as to process in the second mode, the output signal SO1 of the mode selection portion 41 outputs the decay processing conditions which are set by the address SW04 and SW05, and the output signal SO2 outputs the decay processing conditions which are set by the address SW06 and SW07. The selection for processing in the first mode or the second mode is determined by the output signal CL1 of the comparator 131 and the detection start signal OUT_MINON1 of the CLK pulse counter 43.

The output signal CL1 of the comparator 131 is at a high level H when the coil current IOUT1 is more than the reference current value IREF, for example, and is at a low level L when the coil current IOUT1 is less than the reference current value IREF, for example.

The detection start signal OUT_MINON1 is the signal generated at the end of the mandatory power supply duration. The detection start signal OUT_MINON1 is changed from the low level L to the high level H at the end of the mandatory power supply duration, and in addition, is recovered from the high level H to the low level L after a fixed duration. The rising edge of the detection start signal OUT_MINON1 becomes the timing for detecting the potential of the output signal CL1 of the comparator 131.

The mode selection portion 41 detects the end of the mandatory power supply, i.e. the rising edge at which the detection start signal OUT_MINON1 is changed from the low level L to the high level H. In the situation that the potential of the signal CL1 is at the low level L, i.e. in the situation that the coil current IOUT1 does not reach the reference current value IREF, the mode selection portion 41 selects the first mode referenced on address signal SW00~SW03. However, in the situation that the output signal CL1 is at the high level H, i.e. in the situation that the coil current IOUT1 exceeds the reference current value IREF, the second mode is selected referenced on the processing conditions which are set as the address SW04~SW07.

The CLK frequency divider 42 determines the decay time of the coil current IOUT1 flowing into the motor coil L1. The CLK frequency divider 42 divides the reference clock signal CLK according to both the output signal CL1 of the comparator 131 and the output signal SO1 of the mode selection portion 41. In other words, in the situation that when the mandatory power supply is ended, the coil current IOUT1 is less than the reference current value IREF, the rising edge of the detection start signal OUT_MINON1 is generated before the falling edge of the output signal CL1, the output signal SO1 is output first, the reference clock signal CLK is divided by the CLK frequency divider 42 according to the falling edge of the output signal CL1, and the frequency-divided frequency division output signal DCLK is output. Additionally, in the situation that when the mandatory power supply is ended, the coil current IOUT1 is more than the reference current value IREF1, the falling edge of the signal CL1 is generated before the rising edge of the detection start signal OUT_MININ1, the output signal CL1 becomes the low level L first, the CLK frequency divider 42 starts to perform the frequency division according to the output of the output signal SO1, and the frequency division output signal DCLK is output.

The signals for performing each decay are output by the CLK pulse clock 43. The frequency division output signal DCLK of the CLK frequency divider 42 and the output signal SO2 of the mode selection portion 41 are input to the CLK pulse counter 43. Under the situation of the first mode, the decay conditions set by the address SW00 and SW01 are selected from the mode selection signal SW. Under the situation of the second mode, the decay conditions set by the address SW04 and SW05 are selected from the mode selection signal SW.

The frequency division output signal DCLK of the CLK frequency divider 42 is input to the CLK pulse counter 43. For example, after three periods of the frequency division output signal DCLK, the control signal OUT_DECAY1 and the control signal OUT_DECAY2 are output from the CLK pulse counter 43. For example, in the situate that the logic value of the output signal SO2 input to the CLK pulse counter 43 is (0, 1), the control signal OUT_DECAY1 is output during three periods of the frequency division output signal DCLK. Specifically, the low level L is output for the time of one clock, and the high level H is output for the time of other two clocks, for example. Certainly, the sequence of the high level H and the low level L can be exchanged or the numbers of the clock can be adjusted. After the output duration of three periods is ended, the control signal OUT_DECAY1 is initialized to the high level H. Although the output can be continued, it is assumed in the situation that the malfunction occurs, the coil current IOUT1 can be rapidly lowered by initializing the control signal to the high level H to stop the motor, such that the effect of preventing the motor from the damage caused by the malfunction is obtained.

In addition, the control signal OUT_DECAY2 is the signal changed from the low level L to the high level H when the output is ended according to the period set by the control signal OUT_DECAY1. When the control signal OUT_DECAY2 is at the high level H, the motor coil L1 is mandatorily power supplied. The detection start signal OUT_MINON1 is the signal for informing the end of the mandatory power supply. The specific illustration and the following FIG. 4 are together described.

Figure 4:
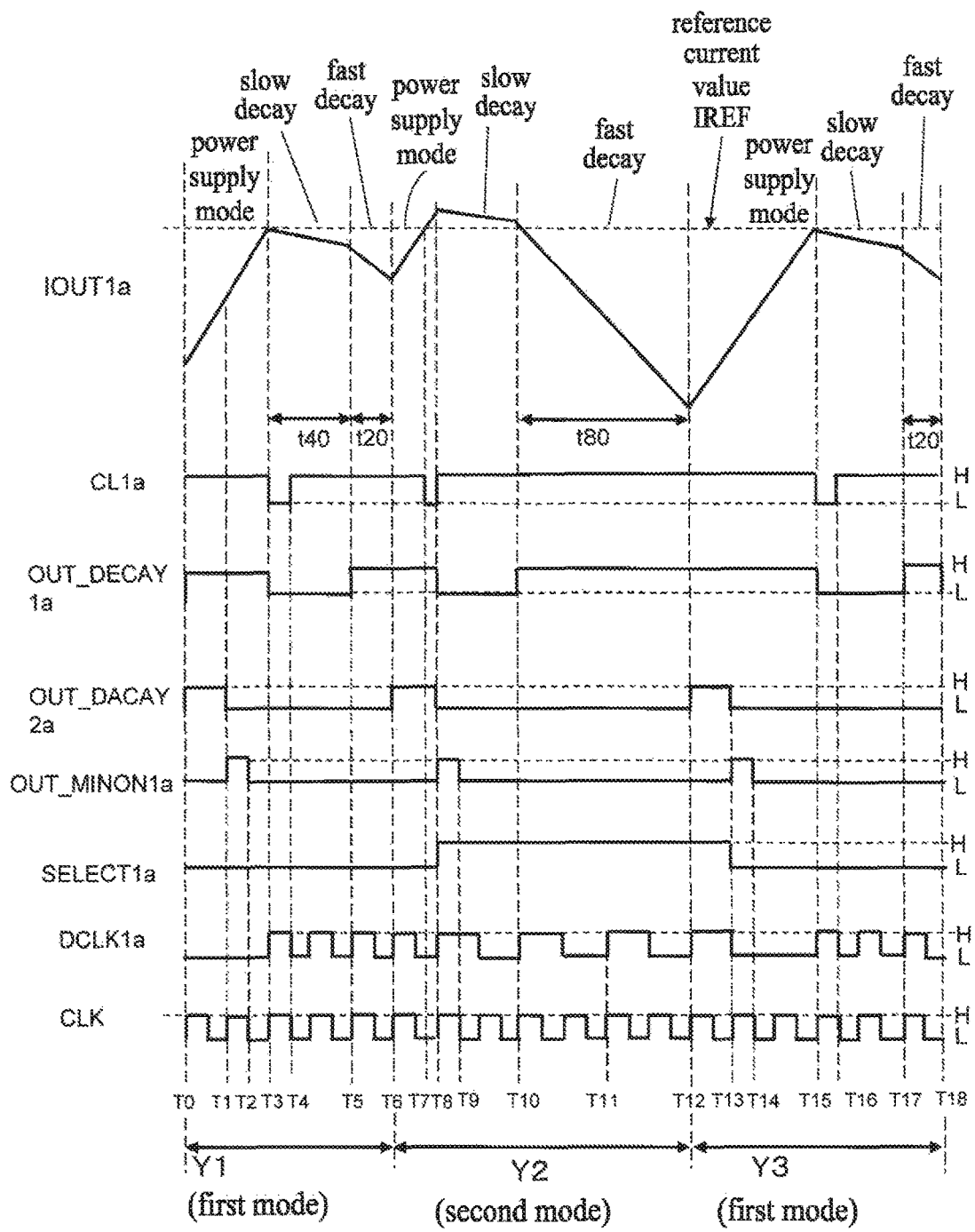
FIG. 4 is a timing chart of the motor driving device shown in FIG. 1 and FIG. 2.

FIG. 4 is a timing chart of the motor driving device according to the first embodiment of the present invention. At the time T0~T6 in the duration Y1, the decay process is implemented in the first mode. The first mode is the manner, for example, that the slow decay is the leading electric current decay, and is used in the situation that the coil current IOUT1$a$ flowing into the motor coil L1 is less than the reference current value IREF. At the time T6~T12 in the duration Y2, the decay process is implemented in the second mode. The second mode is the manner, for example, that the fast decay is the leading electric current decay, and is used in the situation that the coil current IOUT1$a$ flowing into the motor coil L1 exceeds the reference current value IREF. At the time T12~T18 of the duration Y3, the first mode is used. The reason for using the first mode in the duration Y3 is that the coil current IOUT1$a$ in the power supply mode at the time T12~T15 does not exceed the reference current value IREF. It is assumed in the situation that the coil current IOUT1$a$ in the power supply mode at the time T12~T15 exceed the reference current value IREF, the second mode is used. Further, in FIG. 4, "one cycle" recited in this specification is corresponding to the duration from the power supply mode to the next power supply mode, such as the time T3~T6, and the time T8~T12. In these durations, the mix decay mode is performed.

The reference current value IREF indicates the current value at which the coil current IOUT1$a$ should be controlled. The reference current value IREF is referenced on the reference voltage VREF input to the input terminal Ti3 of the input integrated circuit 100A, and is set at the non-inverted input terminal (+) of the comparator 131 through the voltage follower 110 and the DAC 120.

The coil current IOUT1 and IOUT2 flowing into the motor coils L1 and L2 is detected by the output terminals TO13 and TO23 respectively, and the voltage fetched from these external terminals is respectively input to the inverted input terminals (−) of the comparators 131 and 132. The reference current value IREF and the coil current IOUT1 and IOUT2 flowing into the motor coils L1 and L2 are compared by using the comparators 131 and 132, and the negative feedback is formed so that the coil current IOUT1 and IOUT2 become the value of the reference current value IREF.

The coil current IOUT1$a$ enters the power supply mode at the time T0~T3, T6~T8 and T12~T15, and the coil current IOUT1 is increased in these durations. The time T0~T1, the time T6~T8, and the time T12~T13 in the power supply mode are the durations of mandatory power supply. The slow decay is implemented at the time T3~T5, T8~T10 and the time T15~T17, and each decay time has substantially the same length. The fast decay is implemented at the time T5~T6, the time T10~T12 and the time T17~T18. The decay time t20 between the time T5~T6 and between the time T17~T18 is one of the decay time of the slow decay, and is half of the time t40 at the time T3~T5, for example. In addition, the decay time t80 at the time T10~T12 is one decay time of the slow decay, and is twice of the time t40 at the time T3~T5. It can be known that the decay time t80 and t20 indicate the decay time of the fast decay in the difference cycles, and the decay time t80 is longer than the decay time t20. Thus, one of the characteristics of the present invention is that the decay time of the present cycle can be different from the decay time of the previous cycle, and especially, the decay time of the previous cycle can be extended. Further, at the time T0~T7 and the time T10~T18, the current value of the coil current IOUT1$a$ is less than the reference current value IREF1, and at the time T7~T10, the current value of the coil current IOUT1$a$ is more than the reference current value IREF.

The output signal CL1*a* is the signal obtained from the comparison result of the voltage of the resistor R1 and the reference voltage VA1 fetched from the comparator 131. Under the situation of power supply, when the current value of the coil current IOUT1*a* is less than the reference current value IREF, the output signal CL1*a* is at the high level H, and when the current value of the coil current IOUT1*a* is more than the reference current value IREF1, the output signal CL1*a* is at the low level L. In addition, under the situation of the slow decay, according to FIG. 12(*a*), it is apparent to know that the electric current i10*a* does not flow into the resistor R1. Further, under the situation of the fast decay, according to FIG. 12(*b*), it is apparent to know that the electric current i10*b* flows into the resistor R1, but since the electric current i10*b* flows from the ground terminal GND to the power supply Vpp, the output of the output signal CL1*a* is kept at the low level L. It is the result that the time T0~T3, the time T4~T7, the time T10~T15 and the time T16~T18 are at the high level H, and the time T3~T4, the time T7~T10 and the time T15~T16 are at the low level L.

Preferably, the output signal CL1 of the comparator 131 can be set as invalid from the beginning of the decay (the time T8, for example) to the end of the mandatory power supply (the time T13, for example), i.e. the rising edge of the control signal OUT_DECAY1. This is used for preventing the spike noise when the transistors Q11~Q14 constituting the H-bridge circuit are turned on or turned off, as previously described. Hence, the output signal CL1 can be input to the CLK frequency divider 42 and the CLK pulse counter 43 through the latch circuit (not shown), for example.

The control signal OUT_DECAY1*a* is one of the output signals of the auto-decay portion 141. The control signal OUT-DECAY1*a* is prepared for distinguishing the fast decay and the slow decay. The control signal OUT_DECAY1*a* is set at the high level H at the fast decay, for example, and is set at the low level L at the slow decay, for example. In addition, the duration of power supply must be set at any one of the high level H and the low level L, and as previously described, the coil current IOUT1 can be rapidly lowered by initializing the control signal to the high level H to stop the motor, such that the effect of preventing the motor from the damage caused by the malfunction is obtained. Hence, the output of the control signal OUT_DECAY1*a* is at the high level H at the time T0~T3, the time T4~T6, the time T12~T15 and the time T16~T18, and is at the low level L at the time T3~T5 and the time T15~T17.

The control signal OUT_DECAY2*a* is one of the output signals of the auto-decay portion 141. After the time of, for example, three periods of the frequency division output signal DCLK1*a* from the beginning of the slow decay (the time T3, T8), the control signal OUT_DECAY2*a* becomes the high level H from the low level L, and the motor coils L1 and L2 are mandatorily supplied with electric current (mandatory power supply). The duration wherein the signal OUT_DECAY2*a* becomes the high level H is the duration of the mandatory power supply. The high level H is at the time T0~T1, the time T6~T8 and the time T12~T13, and the low level L is at the time T1~T6, the time T8~T12, and the time T13~T18. Additionally, the rising edge of the control signal OUT_DECAY2*a* changing from the low level L to the high level H becomes the timing of the beginning of the power supply mode.

The detection start signal OUT_MINON1*a* is one of the internal signals of the auto-decay portion 141, and is a decay mode detection signal. In this specification, when the above-mentioned duration of the mandatory power supply is ended, the detection start signal OUT_MINON1 becomes the high level H from the low level L during the fixed time, and the output signal CL1*a* of the comparator 131 is detected at the rising edge of the detection start signal OUT_MINON1*a* changing from the low level L to the high level H to determine the decay mode. Therefore, the internal signal OUT_MINON1*a* is at the low level L at the time T0~T1, the time T2~T8, the time T9~T13 and the time T14~T18, and is at the high level H at the time T1~T2, the time T8~T9 and the time T13~T14. Further, the time for detection can be fixed time after the mandatory power supply is ended or after the decay is ended.

The mode change signal SELECT1*a* is one of the internal signals, which are not shown in the figures, of the auto-decay portion 141, and is the signal indicating the decay mode. At the time at which the rising edge of the detection start signal OUT_MINON1*a* is generated, in the situation that the coil current IOUT1*a* is less than the reference current value IREF1, i.e. the counter electromotive force is not generated, the mode change signal SELECT1*a* is at the low level L, and in the situation that the coil current IOUT1*a* is more than the reference current value IREF1, i.e. the counter electromotive force is detected, the mode change signal SELECT1*a* becomes the high level H. Hence, the mode change signal SELECT1*a* is at the low level L at the time T0~T8 and the time T13~T18, and is at the high level H at the time T8~T13.

The frequency division output signal DCLK1*a* is output from the CLK frequency divider 42, and is the signal for determining the decay time of one cycle. The frequency division signal DCLK1*a* is the signal generated by dividing the reference clock signal DCLK, and the frequency division number (frequency division ratio) is set by the mode selection signal SW. If the logic value of the address SW02 and SW03 of the mode selection signal SW is set as (0, 0) by the frequency division output signal DCLK1*a* at the time T3~T6 and the time T15~T18 at which the counter electromotive force cannot be detected, according to FIG. 3(*c*), it can be known that the frequency division output signal DCLK1*a* outputs the signal of 1 frequency division (1 CLK) having the same period as the reference clock signal CLK. In other words, at the time T3~T6 and the time T15~T18, the frequency division output signal DCLK1*a* and the reference clock signal CLK have the same period. Further, at the time T8~T12, the counter electromotive force at the time T8, i.e. the coil current IOUT1*a* exceeds the reference current value IREF, and thus in the second mode, the logic value of the address SW04 and SW05 of the mode selection signal SW is set as (1, 0), and the frequency division output signal DCLK1*a* outputs the signal of the 2 frequency division of the reference clock signal CLK. Hence, at the time T8~T12, the period of the frequency division output signal DCLK1*a* is twice of the period of the reference clock signal CLK.

As previously described, since the decay time of one cycle is set as three periods of the frequency division output signal DCLK1*a*, the period of the frequency division output signal DCLK1*a* in the duration Y2 is twice the period in the duration Y1, and thus the decay time of the duration Y2 is twice the decay time of the duration Y1. Further, in order to correctly count the three periods of the frequency division output signal DCLK1*a*, the CLK frequency divider 42 also outputs the frequency division output signal DCLK1*a* while performing the mandatory power supply. When the mandatory power supply is ended, i.e. when the rising edge of the detection start signal OUT_MINON1*a* is generated, the output of the CLK frequency divider 42 stops.

The reference clock signal CLK is input to the CLK frequency divider 42 to be the reference signal for determining the slow decay, the fast decay and the decay ratio of the combination thereof of the present invention. In this embodiment, for example, the frequency of the reference clock signal CLK is 1 MHz (period is 1 μS), for example, and the frequency is set in the range from 200 KHz to 10 MHz, for example.

Figure 5:
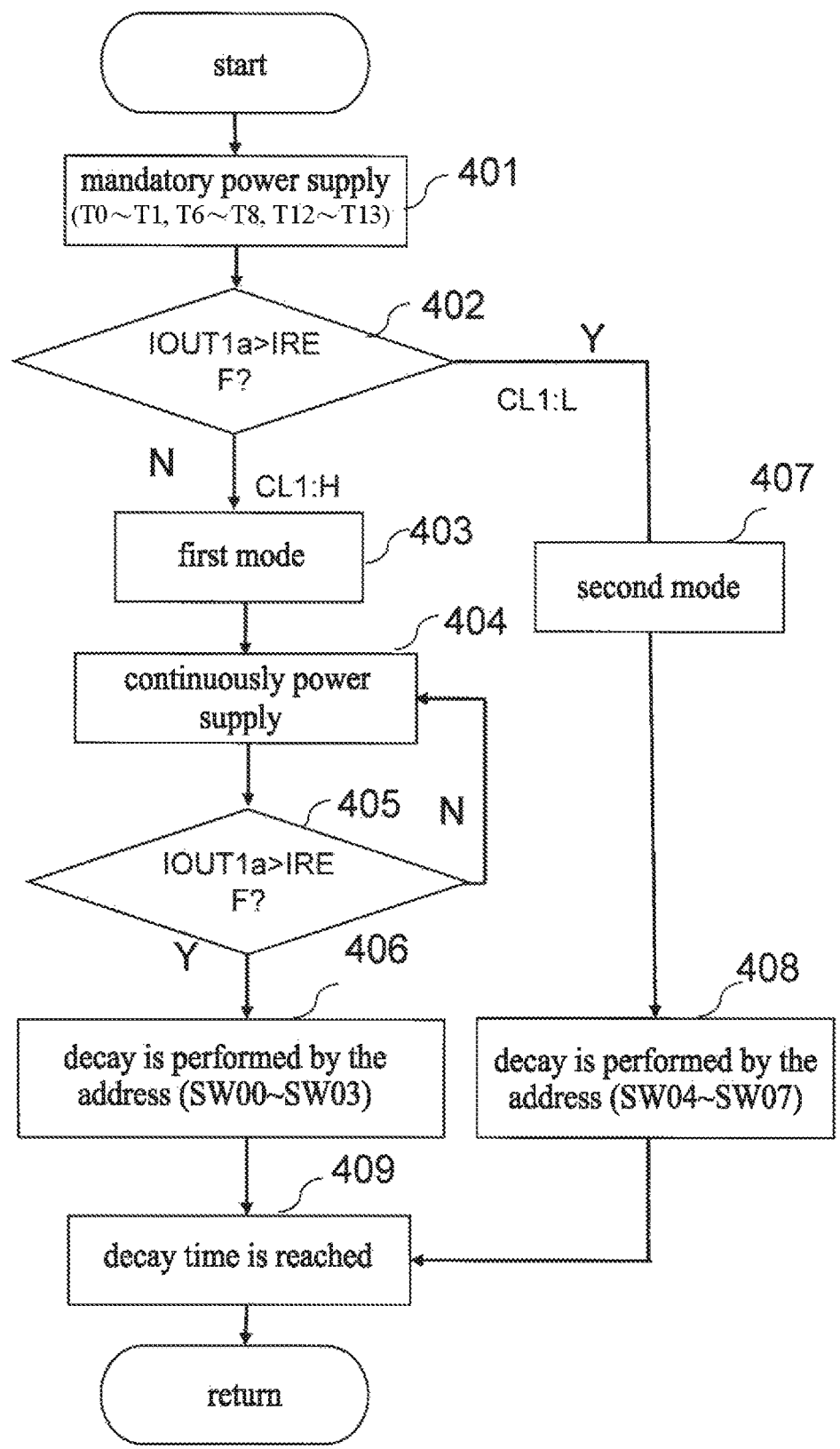
FIG. 5 is a flow chart illustrating the driving method of the motor driving device according to the first embodiment of the present invention.

FIG. 5 is the flow chart illustrating the actions of the motor driving device according to the first embodiment shown in FIG. 1 to FIG. 4. Step 401~Step 409 indicate a process for controlling the motor. Referring to FIG. 1~FIG. 4, FIG. 5 is illustrated as follows.

In Step 401, the power supply mode includes the mandatory power supply which mandatorily provides electric current to the motor coil L. The mandatory power supply mode of the present invention is substantially the same as the technical thoughts published by the patent literature 1. In other words, the mandatory power supply of the present invention mandatorily provides electric current to the motor coil L1 irrelatively to the coil current IOUT1 and the reference current value REF. The timing for performing the mandatory power supply is set by using the reference clock signal CLK, especially implemented at the end of the slow decay or the fast decay and during, for example, one period of the reference clock signal CLK while moving to the next power supply mode. The mandatory power supply of the present invention is the power supply mode shown in FIG. 4 implemented at the time T0~T1 of a part of the duration of the time T0~T3, and at the time T6~T8. In addition, in order to perform the mandatory power supply, the circuit functions of the comparators 131 and 132 temporarily stop. Moreover, the next transmission of the output signals CL1 and CL2 of the comparators 131 and 132 can also be valid without stopping the circuit actions of the comparators 131 and 132.

In Step 402, the coil current IOUT flowing into the motor coil L1 is compared with the reference current value IREF, and the decay mode of the electric current flowing into the motor coil L1 is selected referenced on the comparison result. Herein, when selecting the decay mode of the electric current, first, any one of the first mode and the second mode is selected, and the slow decay or the fast decay is set in the selected mode. At the timing of the end of the mandatory power supply, i.e. the time T1 or the time T8 shown in FIG. 4, the coil current IOUT1 is compared with the reference current value IREF, and the comparison result is output by the comparator 131 as the output signal CL1. At the time T1, the coil current IOUT1 is less than the reference current value IREF, i.e. IOUT1<IREF, and thus the process is proceeding to the first mode, i.e. Step 403. Additionally, at this time, the output signal CL1 is set at the high level H. However, at the time T8, the coil current IOUT1 is more than the reference current value IREF, i.e. IOUT1>IREF, and thus the process is proceeding to the second mode i.e. Step 407. Additionally, at this time the output signal CL1 is set at the low level L. Accordingly, in the situation that the detection result is IOUT1>IREF in Step 402, the electric current flowing into the motor coil L1 must be reduced surely, such that the fast decay is applied or the decay time of one cycle is extended. Even though the status of IOUT1>IREF is detected, if the slow decay is applied as the electric current decay manner, the poor situation that it is difficult to make the coil current IOUT decay and thus fail to achieve the desired decay treatment may occur.

In Step 403, the first mode is set referenced on the detection result that the coil current IOUT1 does not reach the reference current value IREF (IOUT1<IREF). Herein, the first mode uses the slow decay as the leading electric current decay manner. Herein, "slow decay as the leading electric current decay manner" means in one cycle, i.e. in the decay duration of both the slow decay and the fast decay, the proportion of the slow decay is larger. For example, the ratio of the slow decay to the fast decay is set as 2:1. The first mode is determined referenced on the output signal CL1a of the comparator 131.

In Step 404, the motor coil L1 is continuously supplied with power. For the motor coil L1, since the desired electric current, which should be supplied, is not achieved, the regular electric current supply rather than the mandatory power supply is implemented to the motor coil L1. Herein, the power supply is implemented according to the conditions set in the first mode.

In Step 405, the coil current IOUT1 flowing into the motor coil L1 is compared with the reference current value IREF, again. The comparison result of both is output from the comparator 131 as the output signal CL1. As previously described, the output signal CL1 outputs the high level H when IOUT1<IREF, and outputs the low level L when IOUT1>IREF. When the output signal CL1 is at the high level H, i.e. the coil current IOUT1 does not reach the reference current value IREF (N), the process return to the previous power supply mode, i.e. Step 404, to continuously supply power. In Step 405, when IOUT1>IREF is determined (Y), proceed to Step 406.

In Step 406, the decay process is performed referenced on the first mode set by the mode selection signal SW, i.e. the processing conditions set by the address SW00~SW03. In Step 406, when the mode selection signal SW set by the address SW00~SW03 is input to the mode selection portion 41 shown in FIG. 2, the corresponding output signals S01 and S02 are output to the CLK frequency divider 42 and the CLK pulse counter 43. For example, if the logic values of the addresses SW00, SW01, SW02 and SW03 are respectively set as 1, 0, 0 and 0, according to FIG. 3(b), it is known that the ratio of the slow decay to the fast decay in the first mode is 2:1 (slow decay is 67%, fast decay is 33%). Further, according to FIG. 3(c), it is known that the frequency division output signal DCLK1a is set as 1 frequency division, i.e. having the same period as the reference clock signal CLK.

In FIG. 4, the slow decay is performed in the duration of the time T3~T5, and the fast decay is performed in the duration of the time T5~T6. The duration of the time T3~T5 is two periods of the frequency division output signal DCLK1a, and the Time T5~T6 is corresponding to one period of the frequency division output signal DCLK1a. Hence, the slow decay continuously implements twice the time of the fast decay.

In Step 407, the second mode is set referenced on the detection result that the coil current IOUT1 reaches the reference current value IREF (IOUT1>IREF). Herein, the second mode uses the fast decay as the leading electric current decay manner. The second mode is determined referenced on the output signal CL1a of the comparator 131. When the situation that the coil current IOUT in Step 402 exceeds the reference current value IREF (IOUT>IREF) by the mandatory power supply in Step 402 is determined, the electric current decay process must be "surely" implemented, and thus the fast decay is selected as the main decay of the second mode. Herein, "surely" means that the decay of one cycle makes the electric current IOUT1 flowing into the coil L1 be decreased to be more than a certain level. For example, after the mandatory power supply, the coil current IOUT1 is kept less than the reference current value IREF.

In Step 408, the second mode, i.e. the decay process which set by the address SW04~SW07, is performed. In Step 408, the mode selection signal SW set by the address SW04~SW07 is input to the mode selection portion 41 shown in FIG. 2, and the output signals S01 and S02 having these data are respectively output to the CLK frequency divider 42 and the CLK pulse counter 43. For example, if the logic values of the addresses SW04, SW05, SW06 and SW07 are respectively set as 0, 1, 1 and 0, according to FIG. 3(b), it is known that the ratio of the slow decay to the fast decay in the second mode is 1:2 9 (slow decay is 33%. Fast decay is 67%). Further, according to FIG. 3(c), the frequency division output signal DCLK1a is set as 2 frequency divisions, i.e. twice of the time of the reference pulse signal CLK.

Herein, in order to confirm the ratio of the slow decay to the fast decay and the processing time in the second mode, refer to FIG. 4. In FIG. 4, the slow decay is in the duration of the time T8~T10, and the fast decay is in the duration of the time T10~T12. It can be known that the duration of the time T8~T10 is twice (2 frequency divisions) of the period of the reference clock signal CLK, and the fast decay is twice of the slow decay.

In Step 409, while reaching the set decay (decay) time, the decay process stops. In this embodiment, it is set to output, for example, three counts of the frequency division output signal DCLK1a to the CLK pulse counter 43 shown in FIG. 2 to be. Thus, the time for each period of the decay process is the time T3~T6 or the time T8~T12.

When one cycle of the electric current decay process is ended, the process returns to Step 401, entering the mandatory power supply. By repeatedly performing the process shown in FIG. 5, even if the counter electromotive force is generated, the electric current flowing into the motor coils L1 and L2 still can be controlled to be less than the reference current value IREF.

In the first embodiment shown in FIG. 5, it is determined in Step 402 whether the electric current flowing into the motor coils L1 and L2 reaches the reference current value IREF by the initial mandatory power supply of Step 401, and in the situation that the reference current value IREF is reached, the process proceeds to the second mode, i.e. the electric current decay manner which the fast decay is implemented as the leading decay, or the decay time of one cycle is extended. The reason is that in the situation that the coil current IOUT1 in the mandatory power supply mode relatively faster reaches the reference current value IREF, if the more exact electric current decay process than the slow decay is not implemented, it is possible that the coil current may be further raised. Therefore, in the first embodiment, the characteristic is in that the electric current decay process (decay process) is implemented by respectively using the first mode and the second mode which have different processing time respectively set for the slow decay and the fast decay.

Second Embodiment

Figure 6:
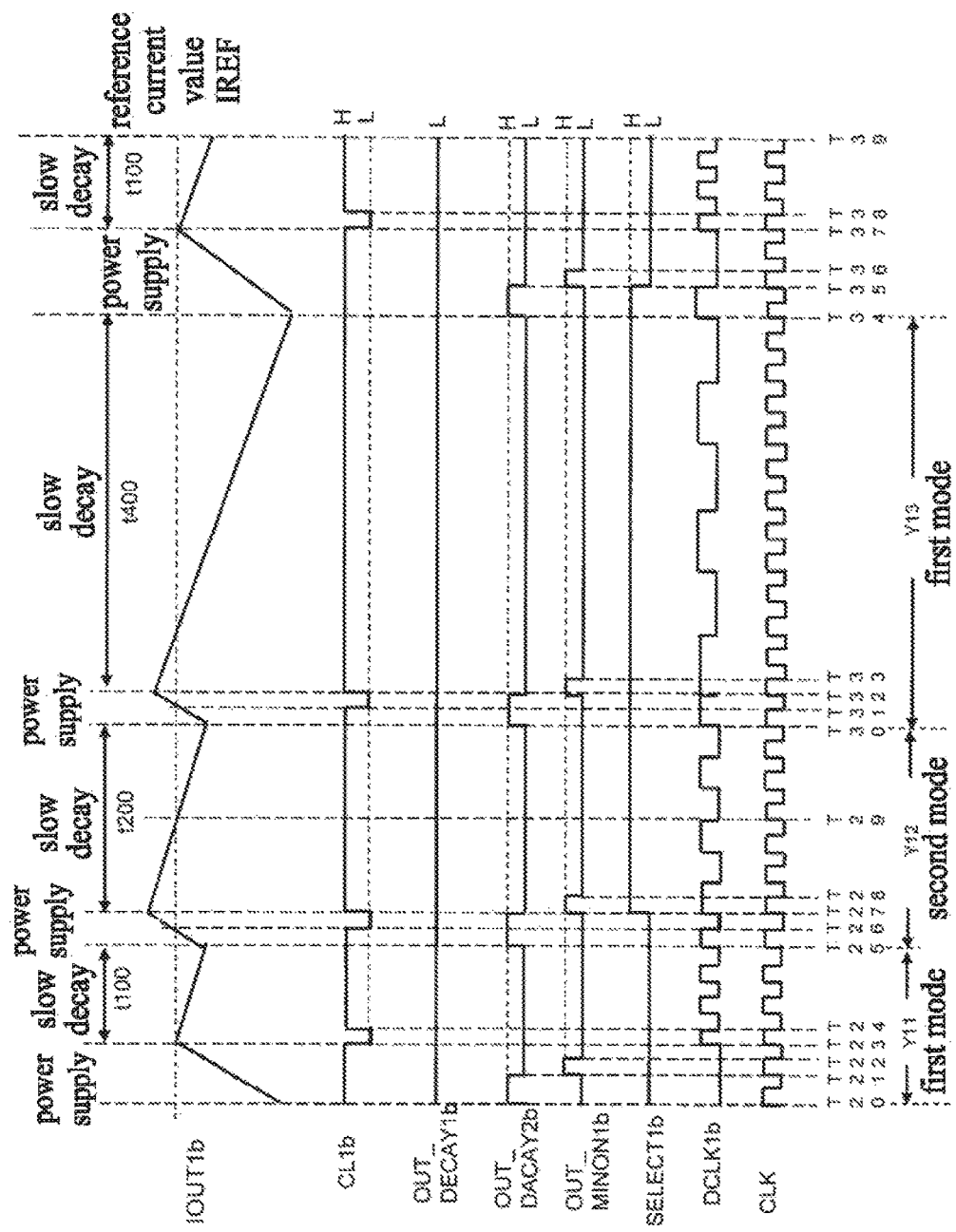
FIG. 6 is a timing chart of the motor driving device according to the second embodiment of the present invention.

FIG. 6 is a timing chart of the motor driving device according to the second embodiment of the present invention. The second embodiment uses the circuit configuration shown in FIG. 1 and FIG. 2 and the address SW00~SW03 of the mode selection signal SW shown in FIG. 3 for determining the default values. Similar to the first embodiment in this regard; however, the second mode in the second embodiment differs from the first embodiment in that the address SW04~SW07 of the mode selection signal SW is not only read, but also automatically changed. In the second embodiment, for example, the logic default values of the address SW00~SW02 and SW03 of the mode selection signal are set as 0, 0, 0 and 0, respectively. In other words, the first mode and the second mode are both controlled by the mode selection signal SW shown in FIG. 3(a). However, the second embodiment uses at least one mode, and the mode selection signal SW includes 4 bits of the address SW00~SW03. Certainly, other setting can be used. Further, a memory can also be used in the mode selection portion 41 for storing the default values, for example. In the duration Y11 (time T20~T25), for example, the first mode is performed, and in the duration Y12 (time T25~T30) and the duration Y13 (time T30~T34), for example, the second mode is performed. If a spindle motor 200 is driven by only the slow decay, the proportion of the slow decay must be 100%, and the proportion of the fast decay must be 0%. Further, even counter electromotive force is detected, no fast decay is used, and the decay time of the slow decay in one cycle is automatically extended. In the situation that it is determined that there is no counter electromotive force, the decay is performed for the initially set decay time.

In FIG. 6, the coil current IOUT1b is the electric current flowing into the motor coil L1. The coil current IOUT1b is generated by the power supply mode for providing electric current to the motor coil L1 at time T20~T23, T25~T27, T30~T32, and time T34~T37. At this time, the coil current IOUT1b is raised. In the power supply mode, time T20~T21, time T25~T27 and time T34~T35 are durations of mandatory power supply. Time T23~T25, T27~T30, time T32~T34 and time T37~T39 are durations of slow decay. The time t200 of time T27~T30 is extended to about twice of the time t100 of the electric current decay processing time of the previous cycle, i.e. time T23~T25 or of time T37~T39. Moreover, the time t400 of time T32~T34 is extended to about twice of the time t200 of the electric current decay duration of the previous cycle, i.e. time T27~T30. Thus, in the second embodiment, one of the characteristics is in that similar to the first embodiment, the electric current decay time of the previous cycle is further extended in the present cycle. In addition, as previously described, the "one cycle" in this specification is the duration from the power supply mode to the next power supply mode, and thus in FIG. 6, it is corresponding to time T27~T30 and T32~T34 at which the slow decay is performed.

The output signal CL1b is the output signal output from the comparator 131. Similar to FIG. 4, in the situation that the power is supplied, when the current value of the coil current IOUT1a is less than the reference current value IREF, the output signal CL1b is at the high level H, and when the current value of the coil current IOUT1a is more than the reference current value IREF1, the output signal CL1 is at the low level L. In the situation of decay, the output of the output signal CL1 is kept at the low level L. Further, FIG. 6 is a schematic view showing the high level H or the low level L of the output signal CL1, and thus when the current value of the coil current IOUT1 is changed from less than the reference current value IREF to more than the reference current value IREF, it is shown that the output signal CL1 is kept at the low level L for a fixed period. The high level H is at time T20~T23, time T24~T26, time T27~T31, time T32~T37 and time T38~T39, and the low level L is at time T23~T24, time T26~T27 and time T37~T38.

The control signal OUT_DECAY1b is output from the auto-decay portion 141, and is set at the low level L in the whole duration, i.e. time T20~T39. In addition, in the situation that 100% of the slow decay is used as the electric current decay mode for performing the process, there is no need to input the control signal OUT_DECAY1b to the circuit of the next stage, and thus it is not necessary to use the control signal OUT_DECAY1b.

The control signal OUT_DECAY2b is output from the auto-decay portion 141. After the slow decay to the coil current IOUT1b is ended, for example, after 3 periods of the frequency division output signal DCLK1b and the duration in which the control signal OUT_DECAY2b is at the high level H, the mandatory power supply is implemented to the motor coil L1. Hence, the control signal OUT_DECAY2b is at the high level H at time T20~T21, time T25~T27, time T30~T32 and time T34~T35, and the control signal OUT_DECAY2b is at the low level L at time T21~T25, time T27~T30, time T32~T34 and time T35~T39.

The detection start signal OUT_MINON1b is input from the CLK pulse counter 43 to the mode selection portion 41 and the CLK frequency divider 42. After the mandatory power supply is ended, the detection start signal OUT_MINON1b is changed from the low level L to the high level H. The output signal CL1b of the comparator 131 is detected at the rising edge of the detection start signal OUT_MINON1b changed from the low level L to the high level H to determine the decay mode. The detection start signal OUT_MINON1b is at the low level L at time T20~T21, time T22~T27, time T28~T32, time T33~T35 and time T36~T39, and the detection start signal OUT_MINON1b is at the high level H at time T21~T22, time T27~T28, time T32~T33 and time T35~T36.

The mode change signal SELECT1b is the signal indicating the decay mode. The second embodiment is similar to the first embodiment, in the situation that the coil current IOUT1b is less than the reference current value IREF1 during the detection, i.e. no counter electromotive force is generated, the mode change signal SELECT1b is at the low level L, and the decay is performed in the first mode. In the situation that the coil current IOUT1 is more than the reference current value IREF1 during the detection, i.e. the counter electromotive force is generated, the mode change signal SELECT1b is at the high level H, and the decay is performed in the second mode. Hence, the mode change signal SELECT1b is at the low level L at time T20~T27 and time T35~T39, and is at the high level H at time T27~T35.

The frequency division output signal DCLK1b is generated by dividing the reference clock signal CLK. The frequency division number (frequency division ratio) of the default values is set by the mode selection signal SW, and frequency division output signal DCKL1b of the second mode is changed referenced on the value of the previous frequency division output signal DCLK1b. The first mode is performed at time T23~T25 and time T37~T39, and the period of the frequency division signal DCLK1b is the same as the default value of the reference clock signal CLK. The second mode is performed at time T27~T30 and T32~T35, the period of the frequency division output signal DCLK1b at time T27~T30 is twice of the frequency division output signal DCLK1b in the decay duration (time T23~T25) of the previous cycle, i.e. twice of the signal reference CLK. The period of the frequency division output signal DCLK1b at time T32~T34 is twice of the frequency division output signal DCLK1b in the decay duration (time T27~T30) of the previous cycle, i.e. four times of the signal reference CLK. Further, similar to the first embodiment, when the mandatory power supply is ended, the frequency division output signal DCLK1b stops.

In other words, in the second embodiment, when the counter electromotive force cannot be detected, the decay is performed in the first mode with better decay efficacy, and when the counter electromotive force is detected, the decay is performed in the second mode which extends (increases) the time (frequency division number) of the decay duration referenced on the time of the decay duration of the previous cycle.

For illustration, the first mode, twice and four times of the decay duration of one cycle of the first mode as the second mode, i.e. three decay durations, are illustrated, but other multiples more than three or three or more types can be used.

Figure 7:
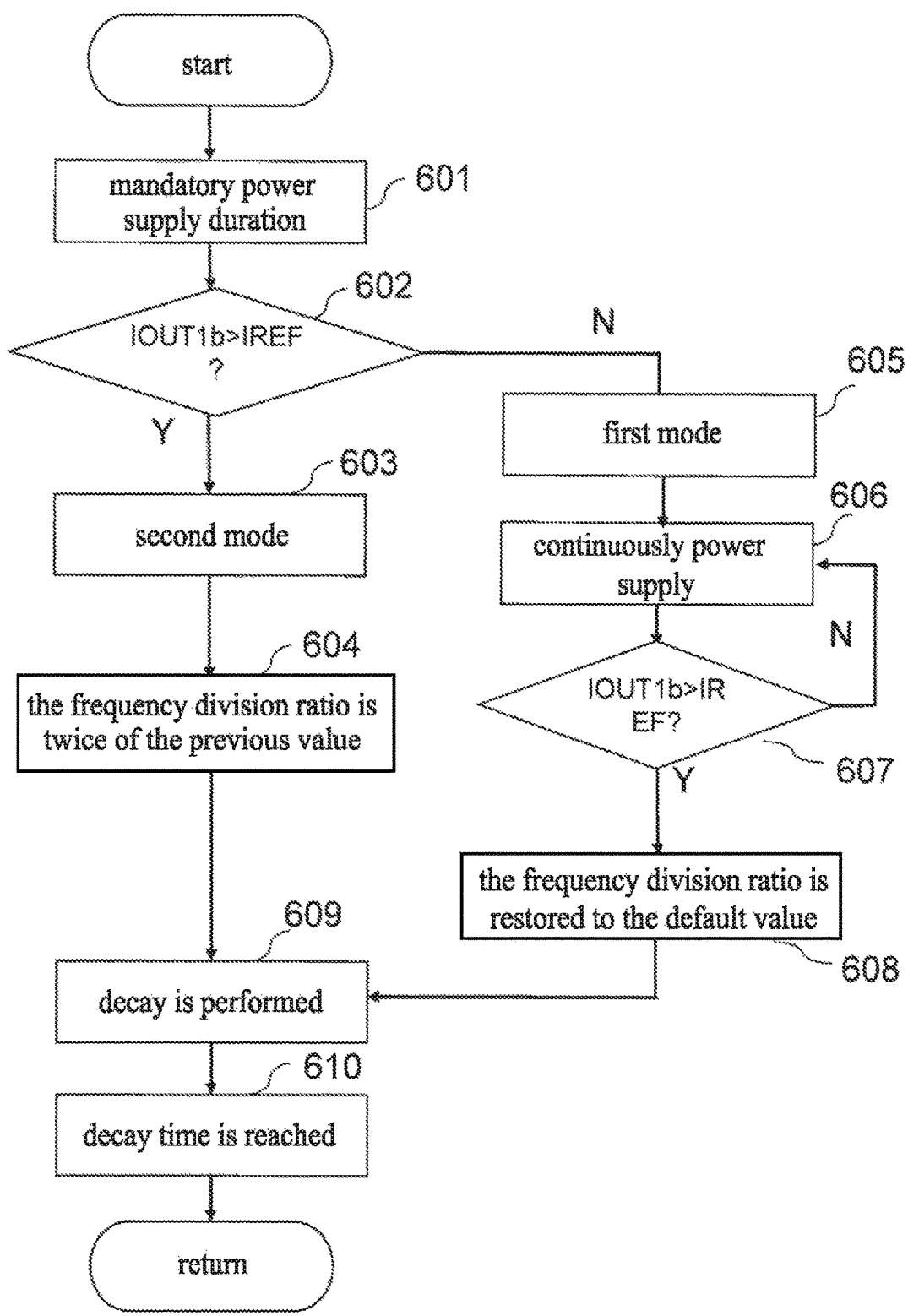
FIG. 7 is a flow chart illustrating the circuit operation of the motor driving device according to the second embodiment of the present invention.

FIG. 7 is the flow chart illustrating the actions of the motor driving device of the second embodiment shown in FIG. 6. As previously described, in the second embodiment, for example, any one of the first mode and the second mode uses the slow decay, but in the situation that the counter electromotive force is detected, the decay duration of one cycle is extended, and in the situation that no counter electromotive force is detected, the decay duration is restored to the original state (default value). In addition, the characteristic of the second embodiment is in that in the situation that after the decay time of one cycle is extended, the suppression of the counter electromotive force is not sufficient, the decay time of the next period is further extended.

In FIG. 7, Step 601 and Step 401 (FIG. 5) are similar, and the mandatory power supply is performed to the motor coil L1 at the initial stage of the more power supply. At this time, the electric current IOUT1a flowing into the motor coil L1 is increased. The durations of the mandatory power supply are time T20~T21, time T25~T27, time T30~T32 and time T34~T35.

Step 602 and Step 402 (FIG. 5) are both the step for determining the decay manner when the mandatory power supply is ended. At time T21 and T35, the coil current IOUT1b is less than the reference current value IREF (IOUT1b<IREF) (N (NO) in Step 602), and thus the process proceeds to Step 605. At time T27 and T32, the coil current IOUT1b exceeds the reference current value IREF (IOUT1b>IREF) (Y (Yes) in Step 602), and thus the process proceeds to Step 603.

In Step 603, since the coil current IOUT1b exceeds the reference current value IREF (IOUT1b>IREF), the second mode is set. The coil current IOUT1b and the reference current value IREF are the status of IOUT1b>IREF at time T27 and T32 in FIG. 6. At this time, the output signal CL1b is at the low level L, and the mode change signal SELECT1b is at the high level H.

In Step 604, the period of the frequency division output signal DCLK1b is set as twice of the period of the previous decay cycle in the second mode. Further, the default value is set as one time, i.e. the frequency division number (frequency division ratio) is set as one time. Specifically, in the situation that the mode selection portion 41 of FIG. 2 performs decay in the second mode, the output signal SO1 is transmitted to the CLK frequency divider 42 so that the frequency division number of the previous decay cycle become twice. Accordingly, the frequency division number of the CLK divider 42 is set as twice. Referring to FIG. 6, for example, from time T27, the period of the frequency division output signal DCLK1b becomes twice at time T23~T25. At time T32, it is determined that there exists the influence of the counter electromotive force, the period of the frequency division signal DCLK1b becomes twice at time T27~T30.

Steps 605~Step 607 are the same as Steps 403~Step 405 in FIG. 5. In other words, in the situation that the coil current IOUT1b does not reach the reference current value IREF by the mandatory power supply, the first mode is selected in Step 601, the slow decay is continuously used for power supply in Step 606, and the coil current IOUT1b and the reference current value IREF are compared again in Step 607. In the situation that the coil current IOUT1b does not reach the reference current value IREF in Step 607, the power supply of Step 606 is continuously performed again, and in the situation that the coil current IOUT1b reaches the reference current value IREF (Y (Yes) in Step 607), the process proceeds to the next step 608.

Step 608 is the process that the frequency division ratio of the CLK frequency divider 42 is restored to the initially set default value in the first mode. In the first mode of the second embodiment, the frequency division ratio is restored to 1, i.e. the value the same as the period of the reference clock signal CLK. Specifically, according to FIG. 6, it is apparently known that the frequency division ratio is 2 until time T27~T30, the frequency division ratio is 4 until time T32~T38, but from time T38, the period of the frequency division signal DCLK1b is restored to the period the same as the reference clock signal CLK.

Steps 609 and 610 indicate that the decay process set in Steps 604 or 608 is performed until the set time. When the decay process set in Step 610 is ended, the process returns to Step 601.

In the second embodiment, the following effects are produced: the ratio of the fast decay is not increased, i.e. the current ripple is kept small, and the second mode makes the decay time of one cycle automatically increased, i.e. the second mode makes the coil current decreased surely by preparing multiple electric current decay modes, so as to suppress the influence of the counter electromotive force surely.

Third Embodiment

Figure 8:
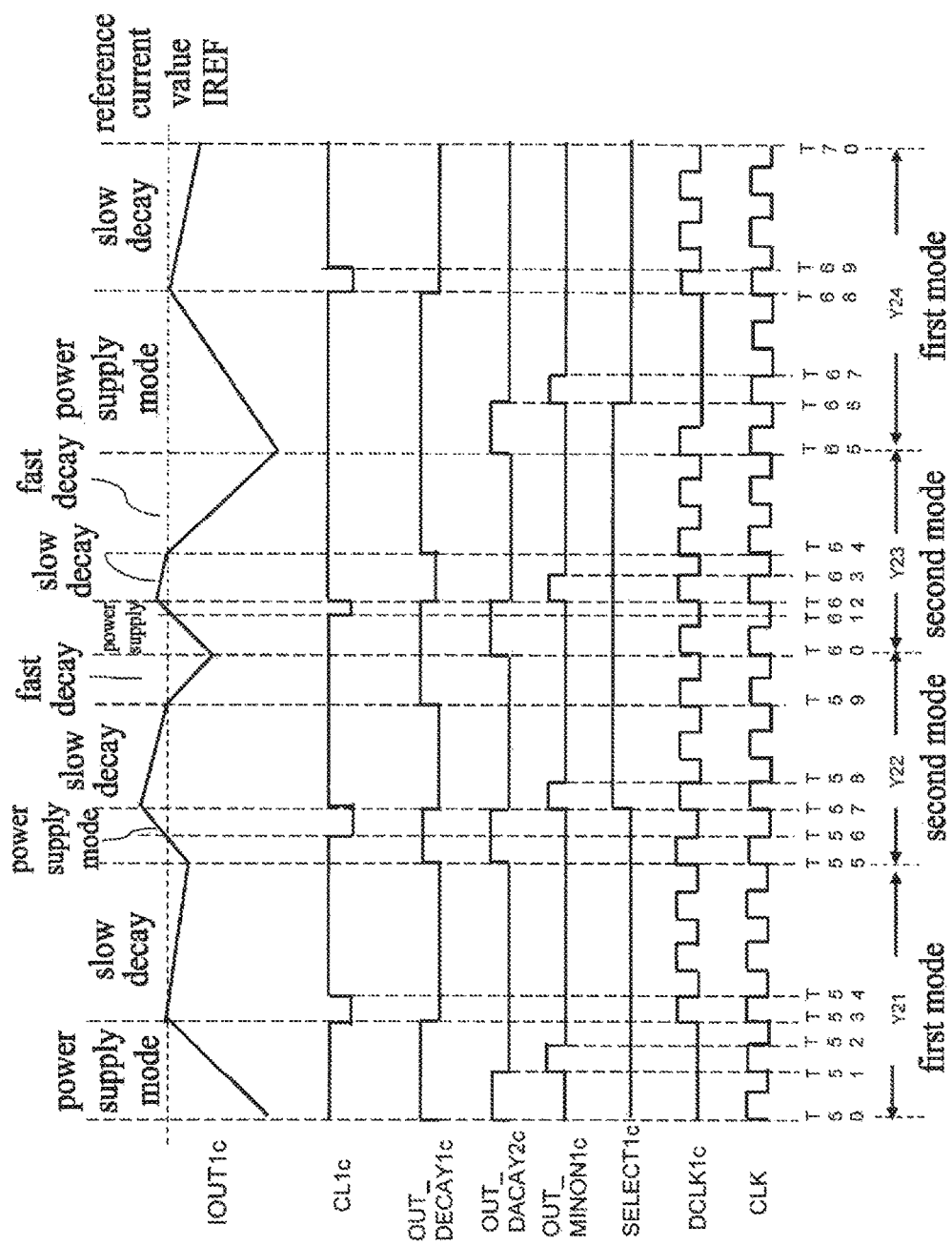
FIG. 8 is a timing chart of the motor driving device according to the third embodiment of the present invention.

FIG. 8 is a timing chart of the motor driving device according to the third embodiment of the present invention. The third embodiment is similar to the first embodiment and the second embodiment, the default values are set referenced on the circuit configuration of FIGS. 1 and 2 and the address SW00~SW03 of the mode selection signal SW shown in FIG. 3. Similar to the second embodiment, the third embodiment differs from the first embodiment in that the address SW04~SW07 of the mode selection signal SW is not read in the second mode, but automatically changed. For example, the logic values of the mode selection signal SW00~SW02 and SW03 are set as 0, 0, 0 and 0, respectively, in the third embodiment. Certainly, the logic values can be set as others. Further, for example, the memory can be used in the mode selection portion 41 for storing the default values. The first mode is performed in the duration Y21 (time T50~T55) and the duration Y24 (time T65~T70), and the second mode is performed in the duration Y22 (time T55~T60) and the duration Y23 (time T60~T65). In the third embodiment, the combination of the slow decay and the fast decay or only the fast decay is used in the second mode.

In FIG. 8, the coil current IOUT1c is increased by the power supply at time T50~T53, time T55~T57, time T60~T62 and time T65~T68, is relatively slowly decreased by the slow decay at time T53~T55, time T57~T59, time T62~T64 and T68~T70, and is rapidly decreased by the fast decay which is faster than the slow decay, at time T59~T60 and time T64~T65.

The output signal CL1c of the comparator 131 is at the high level H at time T50~T53, time T54~T56, time T57~T61, time T62~T68 and time T69~T70, and is at the low level L at time T53~T54, time T56~T57, time T61~T62 and time T68~T69.

The control signal OUT_DECAY1c is at the high level H at the power supply and the fast decay, and is at the low level L at the slow decay. Thus, the control signal OUT_DECAY1c is at the high level H at time T50~T53, time T55~T57, time T59~T62 and time T64~T68, and is at the low level L at time T53~T55, time T57~T59, time T62~T64 and time T68~T70. Further, the fast decay is implemented in the duration of T64~T65, but the processing time is twice of time T59~T60 at which the fast decay is also implemented. In other words, in the decay process of one cycle, at time T57~T60, the proportion of time of the slow decay is 67%, and the proportion of time of the fast decay is 33%. At time T61~T65, the proportion of the slow decay is 33% and the proportion of time of the fast decay is 67%. In other words, it can be known that the proportion of the fast decay in one cycle at time T62~T65 is more than the proportion of time of the fast decay in one cycle at time T57~T60 by 33%.

The control signal OUT_DECAY2c is output from the auto-decay portion 141. When the time of, for example, three periods of the frequency division output signal DCLK2c passed after the beginning of the electric current decay to the coil current IOUT1c, the control signal OUT_DECAY1c becomes the high level H. Thus, the control signal OUT_DECAY2c becomes the high level H at time T50~T51, time T55~T57, time T60~T62 and time T65~T66 and the control signal OUT_DECAY2c becomes the low level L at time T51~T55, time T57~T60, time T62~T65 and time T66~T70.

The control signal OUT_MINON1c is input to the mode selection portion 41 and the CLK frequency divider 42 from the CLK pulse counter 43, but is changed from the low level L to the high level H after the mandatory power supply is ended. The output signal CL1b of the comparator 131 is detected at the rising edge of the signal OUT_MINON1c changing from the low level L to the high level H to determine the decay mode. The internal signal OUT_MINON1c is at the low level L at time T50~T51, time T52~T57, time T58~T62, time T63~T66 and time T67~T70, and is at the high level H at time T51~T52, time T57~T58, time T62~T63 and time T66~T67.

The mode change signal SELECT1c is at the low level L at time T50~T57 and T66~T70, and is at the high level H at time T57~T68.

The frequency division output signal DCLK1c is generated at time T53~T55, time T57~T60, time T62~T65 and time T68~T70. Similar to the first embodiment and the second embodiment, when the mandatory power supply is ended, the frequency division output signal DCLK1c stops. The period of the frequency division output signal DCLK1c of the third embodiment is intermittently generated, but the period during the generation is the same as the period of the reference clock signal CLK.

In other words, in the third embodiment, when the counter electromotive force cannot be detected, the decay is performed in the first mode, which has the good decay efficiency, and when the counter electromotive force is detected, the decay is performed in the second mode which increases combined ratio of the fast decay referenced on the combined ratio of the slow decay and the fast decay of the decay duration of the previous cycle. For illustration, the first mode, the second mode including the fast decay having an increase of 33% of one cycle of the first mode and the second mode including the fast decay having an increase of 66% of one cycle of the first mode, i.e. three decay ratio, are illustrated, but other ratios or more than three types can be used.

Figure 9:
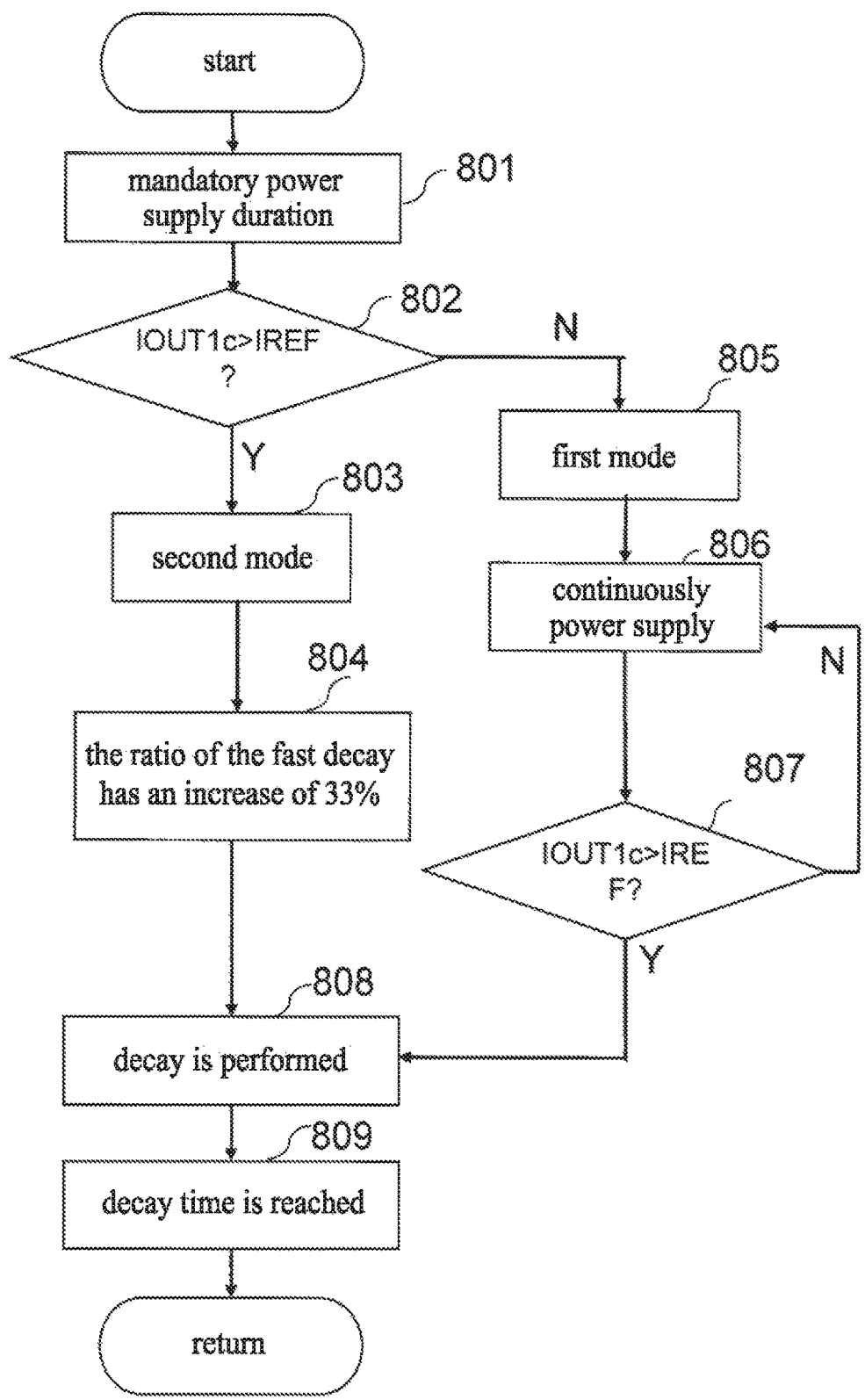
FIG. 9 is a flow chart illustrating the circuit operation of the motor driving device according to the third embodiment of the present invention.

FIG. 9 is a flow chart showing actions of the motor driving device according to the third embodiment shown in FIG. 8.

Step 801 is similar to Step 601 (FIG. 5), wherein the mandatory power supply is performed to the motor coil L1 at the initial stage of the motor power supply. At this time, the electric current IOUT1a flowing into the motor coil L1 is increased. The mandatory power supply is performed at the durations of time T50~T51, time T55~T57, time T60~T62 and time T65~T66.

Step 802 is similar to Step 602 (FIG. 5), wherein the decay manner is determined at the timing of the end of the mandatory power supply. At time T53 and T68, the coil current IOUT1c is less than the reference current value IREF (N (No) in Step 802), thus the process proceeds to Step 805. At time T57 and T62, the coil current IOUT1c exceeds the reference current value IREF (Y (Yes) in Step 802), thus the process proceeds to Step 803.

In Step 803, since the coil current IOUT1c exceeds the reference current value IREF (IOUT1c>IREF), the second mode is set. The second mode uses the fast decay as the leading decay. The coil current IOUT1c and the reference current value IREF become the status of IOUT1c>IREF at time T57 and T62 shown in FIG. 8. At this time, the output signal CL1c is at the low level L, and the mode change signal SELECT1c becomes the high level H.

Step 804 indicates that the ratio of the fast decay has an increase of 33% in the situation that the decay is performed in the second mode. Specifically, the mode selection portion 41 of FIG. 2 is used for outputting the output signal SO2 as the second mode to the CLK pulse counter 43. At this time, in every cycle, the CLK pulse counter 43 makes the fast decay be increased by one cycle in the decay time of one cycle (three periods) of the frequency division output signal DCLK1c. In other words, after time T57, the ratio of the fast decay is increased from 0% to about 33%, and after time T62, the ratio of the fast decay is increased from about 33% to about 67%.

Step 805~Step 807 are the same as Step 403~Step 405 in FIG. 5 and Step 605~Step 607. In other words, in the situation that the coil current IOUT1c does not reaches the reference current value IREF by the mandatory power supply, the first mode is selected in Step 805, the power supply is continuously performed by the slow decay in Step 806, and the coil current IOUT1c and the reference current value IREF are compared again in Step 807. In Step 807, in the situation that the coil current IOUT1c does not reach the reference current value IREF, the power supply of Step 806 is continuously performed again, and in the situation that the coil current IOUT1c reaches the reference current value IREF, the process proceeds to the next Step 808.

Steps 808 and 809 indicate that the decay process set in Step 804 or Steps 805~807 is performed until the set time. When the decay process set in Step 809 is ended, the process returns to Step 801 again.

In the third embodiment, the decay time for every cycle can be kept, and the increment of the coil current caused by the counter electromotive force can be suppressed. Especially, if the status of the large coil current is kept for long time, the vibration of the large stepping motor 200 becomes big, such that the third embodiment is suitable for the decay process of this type of motor.

Fourth Embodiment

Figure 10:
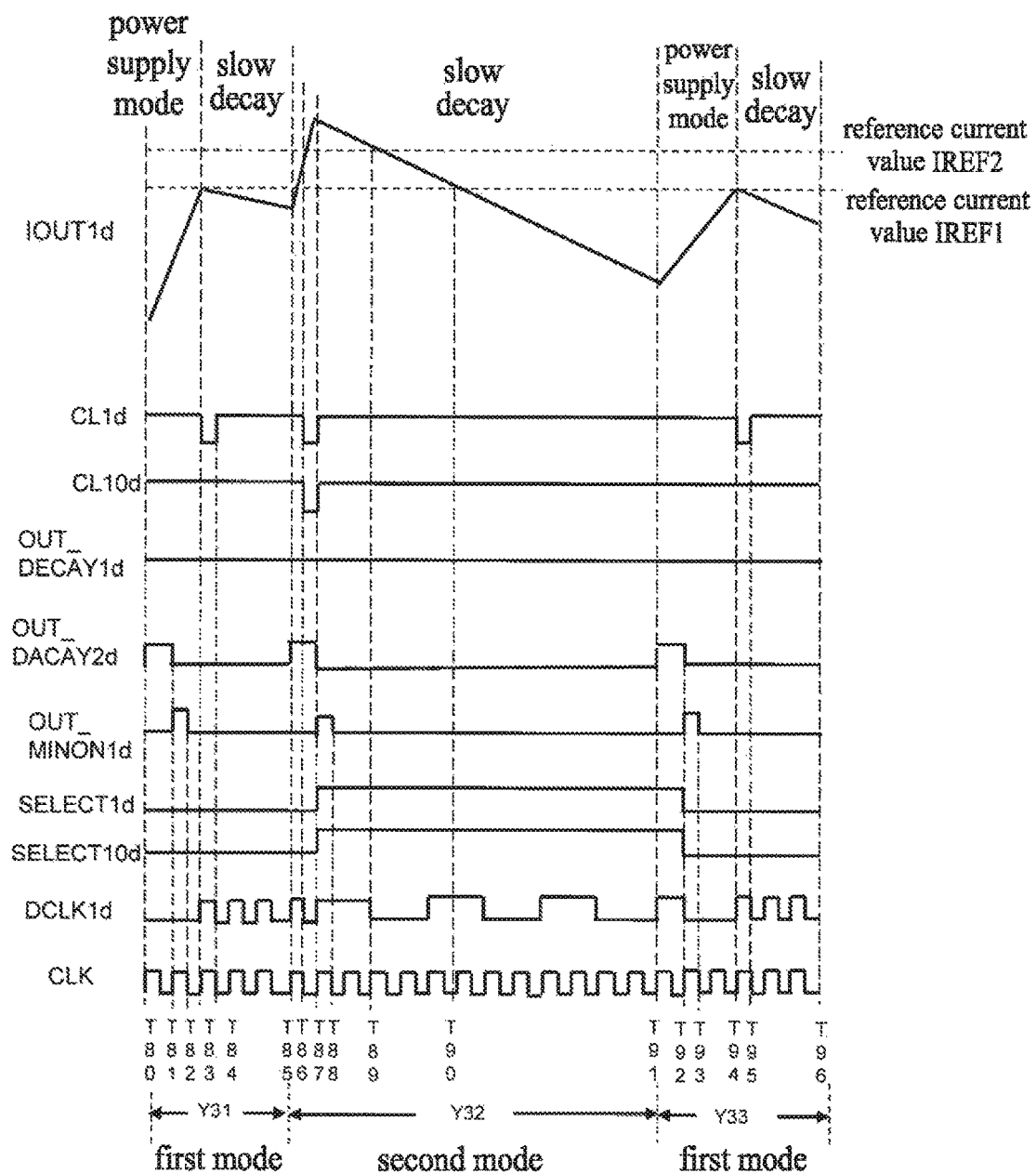
FIG. 10 is a timing chart of the motor driving device according to the fourth embodiment of the present invention.

FIG. 10 is a timing chart of the motor driving device according to the fourth embodiment of the present invention. The fourth embodiment is implemented by using the circuit configuration of FIG. 1 and FIG. 2 and the mode selection signal SW shown in FIG. 3. In the fourth embodiment, the process is performed by the slow decay in any one of the first mode and the second mode. In other words, the slow decay is implemented by all durations of the duration Y31 (time T80~T85), the duration Y32 (time T85~T91) and the duration Y33 (T91~T96).

When the fourth embodiment is implemented, two reference current values are prepared. Thus, the comparators 131 and 132 shown in FIG. 1 respectively have a first comparing mechanism and a second comparing mechanism. These two mechanisms are not shown in FIG. 1. The voltage converted from the first reference current value IREF1 is applied to the first comparing mechanism of the comparator 131, and the voltage converted from the second reference current value IREF2 is applied to the second comparing mechanism of the second comparator. Such voltage is corresponding to the output voltages RNF1 and RNF2 shown in FIG. 1, and two voltages corresponding to the output voltage RNF1 and the output voltage RNF2 are prepared, respectively.

The level of the reference current value IREF2 applied to the second comparing mechanism of the comparator 131 is greater than the level of the reference current value IREF1 applied to the comparing mechanism.

The coil current IOUT1d is increased by the power supply at time T80~T83, time T85~T87 and time T91~T94, and is decreased by the decay process at time T83~T85, time T87~T91 and time T94~T96. Only the slow decay is used in the fourth embodiment, but the combination of the fast decay and the slow decay can also be used. Further, the current value of the coil current IOUT1d is less than the first reference current value IREF1 at time T80~T85 and time T90~T96 The current value of the coil current IOUT1d is more than the first reference current value IREF1 and less than the second reference current value IREF2 around time T85~T86 and time T89~T90. The current value of the coil current IOUT1d is more than the second reference current value IREF2 at time T86~T89.

The first output signal CL1d is output from the first comparing mechanism of the comparator 131. In the situation of power supply, the first output signal CL1d is at the high level H when the coil current IOUT1d does not reach the first reference current value IREF1, and is at the low level L when the coil current IOUT1d exceeds the current value IREF1. In the situation of decay, the output of the output signal CL1d is kept at the low level L. Thus the first output signal CL1d becomes the high level H at time T80~T83, time T84~T86, time T87~T94 and time T95~T96, and becomes the low level at time T83~T84, time T86~T87 and time T94~T95.

The second output signal CL10d is output from the second comparing mechanism of the comparator 131. In the situation of the power supply, the second output signal CL10d is at the high level H when the coil current IOUT1d does not reach the second reference current value IREF2, and is at the low level L when the coil current IOUT1d exceeds the second reference current value IREF2. In the situation of decay, the output of the output signal CL1 is kept at the low level L. Thus, the second output signal CL10d becomes the high level H at time T80~T86 and time T87~T96, and becomes the low level L at time T86~T87.

The control signal OUT_DECAY1$d$, the control signal OUT_DECAY2$d$, the detection start signal OUT_MINON1$d$ and the mode change signal SELECT1$d$ are respectively the same as the control signals OUT_DECAY1$b$ and OUT_DECAY2$b$, the detection start signal OUT_MINON1$b$ and the mode change signal SELECT1$b$ in FIG. 6, and thus the descriptions thereof are omitted.

In the situation that the mode change signal SELECT1$d$ is at the low level L, the first mode is used. In the situation that the mode change signal SELECT1$d$ is at the high level H, the decay manner is determined by the potential of the mode change signal SELECT10$d$. In the situation that the mode change signal SELECT10$d$ is at the low level L, the decay is performed in the second mode, and in the situation that the mode change signal SELECT10$d$ is at the high level H, the decay process is implemented by the third mode.

The mode change signal SELECT10$d$ is like the mode change signal SELECT1$d$, and the signal CL1$d$ is detected at the rising edge of the detection start signal OUT_MINON1$d$ changing from the low level L to the high level H. If the signal CL1$d$ is at the high level H, the mode change signal SELECT10$d$ becomes the low level L, and if the output signal CL1$d$ is at the low level L, the mode change signal SELECT10$d$ becomes the high level H. Thus, the mode change signal SELECT10$d$ becomes the low level L at time T80~T87 and time T92~T96, and becomes the high level H at time T87~T92.

The frequency division output signal DCLK1$d$ generates the clocks at time T82~T85, T87~T91 and time T94~T96. The period at time T82~T85 and time T94~T96 are the default values, and are the same as the period of the reference clock signal CLK. Similar to the second embodiment or the third embodiment, the default value can be set by the mode selection signal SW or can be set by the internal memory. The period at time T87~T91 is four times of the period of the reference clock signal CLK. In other words, in the situation that the mode change signal SELECT1$d$ is at H and the mode change signal SELECT10$d$ is at H, it is regarded that the influence of the counter electromotive force is large, such that the decay time of the previous cycle of the second mode directly becomes four times rather than twice of the decay time of the previous cycle. Thus, the time corresponding to the time T87~T91 is four times of the time of time T82~T85. In addition, as previously described, when the mandatory power supply is ended, the frequency division output signal DCLK1$d$ stops.

Figure 11:
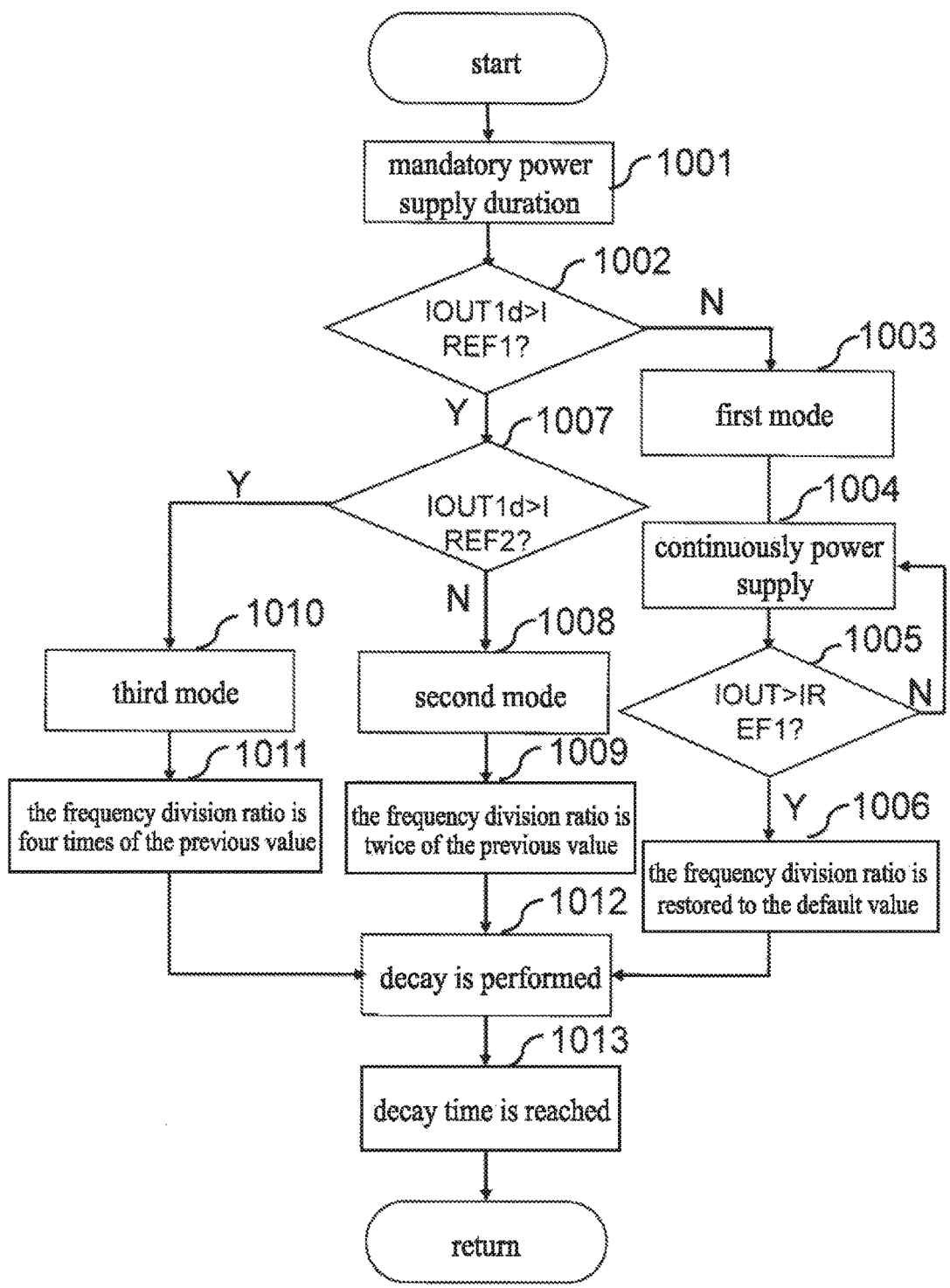
FIG. 11 is a flow chart illustrating the circuit operation of the motor driving device according to the fourth embodiment of the present invention.

FIG. 11 is a flow chart showing the actions of the motor driving device according to the fourth embodiment shown in FIG. 10. The fourth embodiment is implemented by Step 1001~Step 1013. Step 1001~Step 1006 use a portion of the process in the second embodiment shown in FIG. 7. In other words, Steps 1001, 1002, 1003, 1004, 1005 and 1006 shown in FIG. 11 are respectively corresponding to Steps 601, 602, 605, 606, 607 and 608 in FIG. 7. Hence, the descriptions of Steps 1001~1006 are omitted, and Steps 1007~1013 are illustrated as follows.

In Step 1007, when the coil current IOUT1$d$ is greater than the first reference current value IREF1 (Y (Yes) in Step 1002), the coil current IOUT1$d$ and the second reference current value IREF2 are compared. When the coil current IOUT1$d$ is lower than the second reference current value (IREF2) (N (No) in Step 1007), the process proceeds to Step 1008. When the coil current IOUT1$d$ is greater than the second reference current value (IREF2) (Y (Yes) in Step 1007), the process proceeds to Step 1010.

In Step 1008, in the situation that the coil current IOUT1$d$ is between the first reference current value IREF1 and the second reference current value IREF2, the process is performed in the second mode. Although not shown, the mode change signal SELECT1$d$ becomes the high level H, and the mode change signal SELECT10$d$ becomes the low level L at this time.

In Step 1009, in the situation that the process is performed in the second mode, the CLK frequency divider 42 shown in FIG. 2 outputs the signal for performing 2 frequency division to the reference clock signal CLK as the frequency division output signal. Thus, Step 1008~Step 1009 set the same conditions as Step 604 and FIG. 7 of the flow chart of the second embodiment.

In Step 1010, when the coil current IOUT1$d$ is greater than the second reference current value IREF2, the process is performed in the third mode. At this time, as shown in FIG. 10, the mode change signal SELECT1$d$ and the mode change signal SELECT10$d$ respectively become the high level H.

In Step 1011, in the situation that the process is performed in the third mode, the CLK frequency divider 42 shown in FIG. 2 outputs the frequency division output signal for performing 4 frequency division to the reference clock signal CLK. This is corresponding to the time T87~T91 in FIG. 10.

The second decay of the fourth embodiment only shows the change of the frequency division output signal, but the decay mode can also be changed like the third embodiment, i.e. the slow decay or the fast decay. Further, both the clock signal CLK and the decay mode can be changed like the fourth embodiment. For example, in the situation that the current value of the coil current IOUT1$d$ is between the reference current values IREF1 and IREF2, the second mode makes an increase of about 33% for the fast decay. In the situation that the current value of the coil current IOUT1$d$ is greater than the second reference current value IREF2, the third mode makes an increase of about 33% for the fast decay, and the period of the frequency division output signal is set as twice. Certainly, there can be two reference current values as the comparison reference, but there also can be three or four reference current values as the comparison reference.

In comparison with the first embodiment to the third embodiment, multiple reference current values are set in the fourth embodiment. In other words, not only the counter electromotive force can be detected, but also the degree of the increment of the coil current caused by the counter electromotive force is detected, such that multiple decay manners are set. Hence, the power loss is small, and the current value of the coil current can be kept to be less than the reference current value in the short time, regardless of the influence of the counter electromotive force.

Additionally, the fourth embodiment using the two manners of the first mode and the second mode is illustrated, but the process also can be implemented in one mode like the second embodiment and the third embodiment. In this situation, the address of 4 bits is prepared for the mode selection signal SW.

Fifth Embodiment

There is no figure prepared for the fifth embodiment of the present invention. The fifth embodiment is implemented by the combination of the first embodiment and the second embodiment. In other words, if the logic value of the address (SW00, SW01) of the mode selection signal SW is set as (0,0) in the first mode, the ratio of the slow decay becomes 100%, and in this situation, the decay process is implemented based on the flow chart shown in FIG. 7. Further, in the situation that the logic value of the address (SW00, SW01) is set other than (0, 0), the decay process can be implemented according to the flow chart shown in FIG. 5.

In the fifth embodiment, there are following advantages: the generation of the counter electromotive force is suppressed in correspondence to both situations that a user uses the fast decay and the slow decay for suppressing the deformation of the current ripples and that a user uses only the slow decay for suppressing the current ripples and the power loss.

Sixth Embodiment

Similar to the fifth embodiment, there is no figure prepared for the sixth embodiment. The sixth embodiment includes the combination of the second embodiment and the third embodiment. In other words, the following electric current decay process is implemented. The first mode uses the slow decay, and in the situation that the counter electromotive force is detected, the process proceeds to the second mode, such that the decay time for every cycle of the decay process becomes larger or the ratio of the fast decay is increased.

In the sixth embodiment, for example, it is assumed that when the mandatory power supply is ended, the counter electromotive force is detected. In this situation, for example, the frequency division ratio of the CLK frequency divider 42 is increased, and for example, the frequency division ratio of the CLK frequency divider 42 is set as twice. The decay process is tried to be implemented with such condition during one cycle. Hereafter, it is detected whether the counter electromotive force is generated. In the situation that no counter electromotive force is generated, the slow decay is selected. In the situation that the counter electromotive force still has influence, for example, the frequency division ratio is kept as twice, making an increase of about 33% for the fast decay. If there is the remained the influence of the counter electromotive force, the fast decay is further allowed to have an increase of about 33%. In the situation that it is determined by the detection after the mandatory power supply that no counter electromotive force exists, the decay process is implemented by the slow decay, i.e. the same period as the reference clock signal CLK. In summary, the sixth embodiment is the combined decay manner of the second embodiment and the third embodiment, and the selection or the processing time of the decay mode is the items of design.

Other Embodiments

The main embodiments of the present invention are illustrated in the above descriptions, and various embodiments other than the above embodiments can be considered. For example, all or a part of at least two embodiments of the first embodiment, the second embodiment, the third embodiment, the fourth embodiment and the fifth embodiment can be combined to form the embodiment. Proper selections of types of motors or conditions for using motors can be made in the industry.

The motor driving device of the present invention is not limited to the stepping motor, and can be applied to other motors. In other words, the motor driving device can be used for driving for example, a three-phase motor, in which the H-bridge is used.

INDUSTRIAL APPLICABILITY

The preset invention can reduce the deviation of the electric current flowing into the motor coil caused by the generation of the counter electromotive force, and can further suppress the deformation generated on the electric current. Thus, it has better efficacy especially in the motor driving device, particularly in the stepping motor driving device, and has excellent applicability in the industry.

What is claimed is:
1. A motor driving device, comprising:
an electric current detecting portion for detecting electric current flowing into a motor coil; and
an auto-decay portion for performing a power supply mode to increase the electric current flowing into the motor coil before a current value detected by the electric current detecting portion reaches a reference current value, and performing a decay control to the electric current flowing into the motor coil by using a previous cycle and a present cycle after a current value detected by the electric current detecting portion reaches the reference current value,
wherein the auto-decay portion is configured to control so that a decay time of the previous cycle is different from a decay time of the present cycle,
wherein a first mode and a second mode are set by a mode selection signal, wherein the first mode selects a specified combined ratio of a slow decay mode and a fast decay mode and sets a processing time of the slow decay mode and the fast decay mode as a specified value, and the second mode has at least one of a combined ratio and a processing time of the fast decay being larger than that of the first mode.
2. The motor driving device according to claim 1, wherein the decay time of the present cycle is extended to be longer than the decay time of the previous cycle.
3. The motor driving device according to claim 1, wherein the electric current in one cycle has at least three kinds of decay time.
4. A driving method for a motor driving device, comprising the following steps to drive the motor driving device of claim 3:
a power supply step (401) of providing electric current to the motor coil;
a step (402) of comparing whether coil current flowing into the motor coil reaches the reference current value by using the electric current detecting portion;
a step (404) of continuously performing the power supply step in the situation that the coil current does not reach the reference current value;
a step (405) of comparing whether the coil current reaches the reference current value again, and returning to the previous power supply step in the situation that the coil current does not reach the reference current value;
a step (406) of performing the decay process to the coil current in the first mode in the situation that the coil current reaches the reference current value in the step (405); and
a step (408) of the decay process is performed to the coil current in the second mode in the situation that it is determined in the step (402) that the coil current reaches the reference current value, wherein at least one of a decay time of the step (406) and a decay time of the step (408) is set by a mode selection signal, wherein a frequency division ratio of the CLK frequency divider is set by the mode selection signal in the step (406) and the step (408).

5. A driving method for a motor driving device, comprising the following steps to drive the motor driving device of claim 3:

a power supply step (601) of providing electric current to the motor coil;

a step (602) of comparing to determine whether coil current flowing into the motor coil reaches the reference current value by using the electric current detecting portion;

a step (604) of setting a frequency division ratio of the CLK frequency divider to be larger than a default value in the situation that it is determined that the coil current reaches the reference current value;

a step (609) of allowing the coil current to decay in a specified duration by using the frequency division ratio set in the step (604);

a step (606) of continuously performing the power supply in the situation that it is determined in the step (602) that the coil current does not reach the reference current value;

a step (607) of comparing whether the coil current reaches the reference current value again based on the power supply implemented in the step (606), and returning to the step (606) in the situation that the coil current does not reach the reference current value;

a step (608) of restoring the frequency division ratio to the default value in the situation that the coil current reaches the reference current value; and a step (610) of performing the step (609) till a specified time after the step (608).

6. A driving method for a motor driving device, comprising the following steps to drive the motor driving device of claim 3:

a power supply step (801) of providing electric current to the motor coil;

a step (802) of comparing whether coil current flowing into the motor coil reaches the reference current value by using the electric current detecting portion;

a step (804) of increasing a ratio of the fast decay to the whole decay in the situation that it is determined that the coil current reaches the reference current value;

a step (806) of continuously performing the power supply in the situation that it is determined in the step (802) that the coil current does not reach the reference current value;

a step (807) of comparing whether the coil current reaches the reference current value again based on the power supply continuously implemented in the step (806), and returning to the step (806) in the situation that it is determined that the coil current does not reach the reference current value; and a step (809) of performing the decay process corresponding to the step (804) or the step (807) till a specified time, wherein at least one of the ratio of the fast decay to the whole decay of the step (804) and the specified time of the step (809) is set by a mode selection signal, wherein a frequency division ratio of the CLK frequency divider is set by the mode selection signal in the step (804) and the step (809).

7. A driving method for a motor driving device, comprising the following steps to drive the motor driving device of claim 3:

a power supply step (1001) of providing electric current to the motor coil;

a step (1002) of comparing to determine whether coil current flowing into the motor coil reaches the first reference current value by using the electric current detecting portion;

a step (1007), in the situation that it is determined that the coil current reaches the first reference current value, comparing the coil current with the second reference current value, which is larger than the first reference current value;

a step (1009) of changing the frequency division ratio to M (M is a natural number) times of a default value in the situation that it is determined that the coil current does not exceed the second reference current value;

a step (1004) of continuously performing the power supply to the motor coil in the situation that it is determined in the step (1002) that the coil current does not reach the first reference current value;

a step (1005) of comparing whether the coil current in the step (1004) reaches the first reference current value, and returning to the step (1004) in the situation that it is determined that the coil current does not reach the first reference current value;

a step (1006) of restoring the frequency division ratio to a default value in the situation that it is determined in the step (1005) that the coil current reaches the first reference current value;

a step (1011) of changing the frequency division ratio to N times, which is larger than M times, in the situation that it is determined in the step (1007) that the coil current reaches the second reference current value; and a step (1012) of performing the decay process of the coil current by using any one frequency division ration set in the steps (1006), (1009) and (1011).

8. The motor driving device according to claim 1, wherein the auto-decay portion includes:

a mode selection portion, to which an output of the electric current detecting portion and the mode selection signal are input;

a CLK frequency divider, to which a reference clock signal is applied, for performing frequency division to the reference clock signal according to an output of the mode selection portion; and a CLK pulse counter for counting the number of pulses of the reference clock signal based on an output of the CLK frequency divider, wherein the first mode or the second mode is implemented based on an output of the CLK pulse counter.

9. The motor driving device according to claim 8, further comprising a second reference current value being set as a current value greater than the reference current value, wherein after the electric current detected by the electric current detecting portion reaches the second reference current value, the auto-decay portion controls the decay process in a third mode, which has at least one of the combined ratio and the processing time of the fast decay being higher or longer than that of the second mode.

10. The motor driving device according to claim 9, wherein an implementation of the second mode is changed based on any one of a combined ratio of decay of the previous cycle and the processing time of the previous cycle.

11. The motor driving device according to claim 10, wherein based on the output of the electric current detecting portion, an output signal, which is set as a specified frequency division ratio, is input to the CLK frequency divider by the mode selection portion, and an output signal, which sets any one of the slow decay mode and the fast decay mode, is applied to the CLK pulse counter by the mode selection portion.

12. The motor driving device according to claim 11, wherein after the CLK pulse counter counts a specified number of the reference clock signal, a signal for starting the power supply mode is applied to the mode selection portion.

13. The motor driving device according to claim 12, wherein the motor is a stepping motor.

14. The motor driving device according to claim 13, wherein the motor is a direct current motor.

15. A motor driving device, comprising:
an electric current detecting portion for detecting electric current flowing into a motor coil; and
an auto-decay portion for performing a power supply mode to increase the electric current flowing into the motor coil before a current value detected by the electric current detecting portion that reaches a reference current value, and performing a decay control to the electric current flowing into the motor coil by using a slow decay mode or a fast decay mode faster than the slow decay mode after a current value detected by the electric current detecting portion reaches the reference current value,
wherein the auto-decay portion controls at least three kinds of a combined ratio of the slow decay mode and the fast decay mode, and according to a current value detected by the electric current detecting portion, a mode selection signal feeding into the auto-decay portion is set to process in a first mode or a second mode, and at least one combined ratio of the slow decay mode and the fast decay mode is set by a bit configuration of the mode selection signal in the first mode or the second mode.

16. A motor driving device, comprising:
an auto-decay portion for performing a power supply mode to increase an electric current flowing into a motor coil before a predetermined reference current value is reached, and performing a decay control to the electric current flowing into the motor coil after the electric current flowing into the motor coil reaches the reference current value,
wherein the auto-decay portion is configured to control so that a decay time of the previous cycle is different from a decay time of the present cycle,
wherein a first mode and a second mode are set by a mode selection signal, wherein the first mode selects a specified combined ratio of a slow decay mode and a fast decay mode and sets a processing time of the slow decay mode and the fast decay mode as a specified value, and the second mode has at least one of a combined ratio and a processing time of the fast decay being larger than that of the first mode.

* * * * *